US011513244B1

(12) United States Patent
Bryant et al.

(10) Patent No.: US 11,513,244 B1
(45) Date of Patent: Nov. 29, 2022

(54) SYSTEM AND METHOD FOR PREDICTIVE MONITORING GEOLOGICAL AND METEOROLOGICAL EFFECTS ON SUBSURFACE INFRASTRUCTURE SYSTEMS AND REPORTING EMERGENCY CONDITIONS

(71) Applicant: EarthSystems Technologies, Inc., Carrollton, TX (US)

(72) Inventors: John Bryant, Dallas, TX (US); Hayden Fischer, Castle Rock, CO (US)

(73) Assignee: EarthSystems Technologies, Inc., Carrollton, TX (US)

( * ) Notice: Subject to any disclaimer, the term of this patent is extended or adjusted under 35 U.S.C. 154(b) by 8 days.

(21) Appl. No.: 17/302,050

(22) Filed: Apr. 22, 2021

Related U.S. Application Data

(60) Provisional application No. 62/704,122, filed on Apr. 22, 2020.

(51) Int. Cl.
*G01V 1/00* (2006.01)
*G01W 1/10* (2006.01)
*G06F 16/29* (2019.01)

(52) U.S. Cl.
CPC ............ *G01V 1/008* (2013.01); *G01W 1/10* (2013.01); *G06F 16/29* (2019.01)

(58) Field of Classification Search
CPC .......... G01V 1/008; G06F 16/29; G01W 1/10
See application file for complete search history.

(56) References Cited

U.S. PATENT DOCUMENTS

| 7,280,920 | B1 | 10/2007 | Whiteside et al. |
| 9,285,504 | B2 | 3/2016 | Dannevik et al. |
| 9,558,644 | B2 | 1/2017 | Warren et al. |
| 10,296,981 | B2 | 5/2019 | Kaplan et al. |

FOREIGN PATENT DOCUMENTS

WO  WO-2010020526 A2 *  2/2010  ............. G06Q 40/06

OTHER PUBLICATIONS

"Criteria for Selection and Design of Residential Slabs-on-Ground", Building Research Advisory Board, National Academy of Sciences, publication 1571, Jan. 22, 1968.

* cited by examiner

*Primary Examiner* — Yoshihisa Ishizuka
(74) *Attorney, Agent, or Firm* — Schultz & Associates, P.C.

(57) ABSTRACT

A system that considers meteorological data and geophysical data on a recursive basis to generate advanced warning of conditions which may cause imminent damage to infrastructure as a result of upcoming or recent meteorological and geophysical characteristics for any given geographic region is provided. A set of novel seismic risk factors, surficial geology rating factors, expansive soils rating factors, soil hydrology rating factors, topography rating factors, climatic rating factors, seismic activity rating factors, seismic fault rating factors and global weighting factors is provided.

39 Claims, 24 Drawing Sheets
(17 of 24 Drawing Sheet(s) Filed in Color)

SYSTEM AND METHOD FOR PREDICTIVE MONITORING GEOLOGICAL AND METEOROLOGICAL EFFECTS ON SUBSURFACE INFRASTRUCTURE SYSTEMS AND REPORTING EMERGENCY CONDITIONS

CROSS-REFERENCE TO RELATED APPLICATIONS

This application claims priority benefit from U.S. Provisional Application No. 62/704,122, filed on Apr. 22, 2020. The patent application identified above is incorporated here by reference in its entirety to provide continuity of disclosure.

FIELD OF THE INVENTION

The present invention relates to methods for predicting damage to subsurface infrastructure from geological effects.

BACKGROUND OF THE INVENTION

Recent meteorological events have underscored the necessity for advance warning of climate events that can lead to failure of infrastructure systems, such as power grids, gas mains and water distribution systems.

In the United States, it is estimated that construction and maintenance of infrastructure systems costs between 6%-30% of all budgeted expenditures by municipalities and state governments. State and municipal spending accounts for over 75% of the public funding used for infrastructure each year, which amounted to $342 billion in 2017. Such large scale expenditure of societal resources mandates that these infrastructure systems be protected from natural disaster and increasingly severe meteorological events to preserve investment and protect life and property.

Underground conduits for water, sewer, natural gas and electrical utility systems are expensive and are intended to last for extended periods of time. Predicting the potential risks to these systems posed by unexpected soil movement is therefore important to ensure public safety, and to reduce system failures and maintenance costs.

The prior art has attempted to address these problems, but all have fallen short.

For example, U.S. Pat. No. 9,558,644 to Warren, et al. discloses the use of a plurality of sensors integrated in a building's infrastructure to detect earthquakes occurring and provide a warning. However, Warren does not make predictions as to future events or the effect on infrastructure.

As another example, U.S. Pat. No. 7,280,920 to Whiteside, et al. discloses a method for forecasting earthquakes using historical data, natural and induced seismic activity, tidal effects, weather, and space weather phenomena, such as solar flares and using the predictions for financial profitability and risk management through early warning systems and proactive disaster preparedness. However, Whiteside does not consider geophysical characteristics in a region or meteorological events to anticipate the effects on infrastructure.

As yet another example, U.S. Pat. No. 10,296,981 to Kaplan, et al. discloses a system and method for predicting extreme weather and the resulting damage. Kaplan contemplates providing emergency funding to assist for infrastructure repair but does not consider geophysical characteristics to predict damage or to proactively prepare infrastructure systems.

Similarly, U.S. Pat. No. 9,285,504 to Dannevik, et al. describes a system for predicting weather conditions and effects on infrastructure. However, Dannevik does not consider geophysical characteristics using the predictions to perform proactive maintenance and repairs to infrastructure.

Hence, there is a need for a system that monitors both meteorological data and geophysical data, on a flexible recursive basis, to generate advance warning of conditions which may cause imminent damage to infrastructure.

SUMMARY OF THE INVENTION

A preferred embodiment of the invention gathers and analyzes various data types related to large scale subsurface geological features, soil type, seismic activity, and meteorological events and then normalizes it for a specified geographical area to create and constantly update an "earth factor risk model" or "EFRM." The EFRM is an abstraction of many types of relevant data, obtained on a flexible recursive basis, computationally weighted in a novel method, organized and then displayed in a way that readily conveys to the user the risks to large scale infrastructure projects presented by potential movement of large scale geological formations. The preferred embodiment obtains historical, current and predicted meteorological moisture data for a geographical area and then combines it to continuously update and monitor the EFRM which predicts soil movement that would threaten subsurface infrastructure systems. The preferred embodiment dynamically adjusts the recursive frequency of data collection based on predicted changes to sensitive data types to efficiently update the EFRM. The preferred embodiment further sends reports and emergency alerts based on the likelihood of predicted soil movement. Emergency alerts are important to preventative maintenance programs, such as subsurface natural gas transmission lines, to prevent explosions and loss of life and property.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness.

Figure 1:
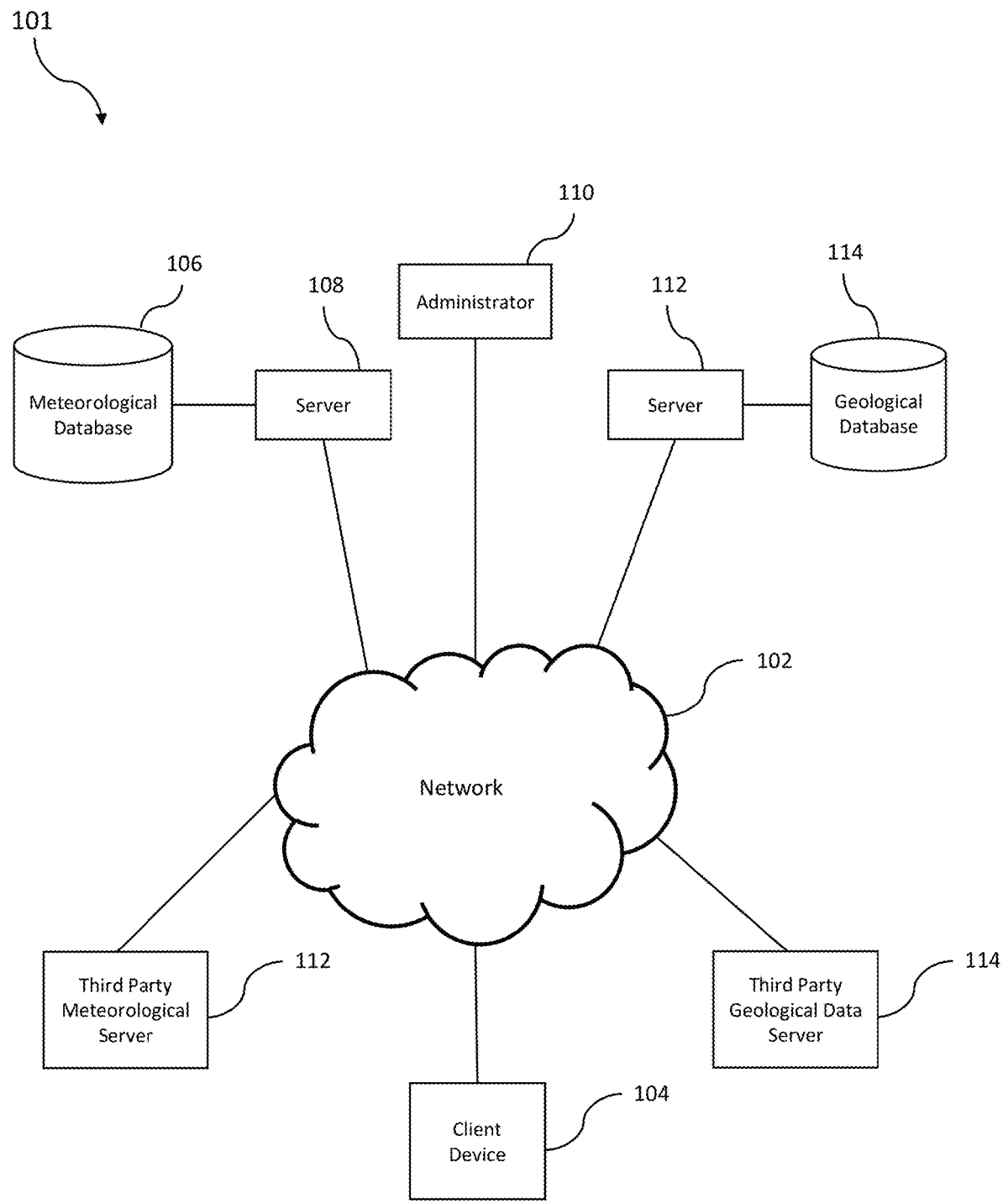
FIG. 1 is an architecture drawing of a preferred embodiment of an automated data collection and alert generation system.

Referring to FIG. 1, the system for automated data collection 101 and EFRM and alert generation will be described.

System 101 includes network 102 connected to meteorological server 108, administrator device 110, geological server 112, and client device 104.

In a preferred embodiment, meteorological server 108 is operatively connected to meteorological database 106. Meteorological database 106 contains a listing of all meteorological activity associated with a geographic location. In a preferred embodiment, the server includes servers from the National Oceanographic and Atmospheric Administration (NOAA) that periodically collects weather data on a county by county basis.

Geological server 112 is connected to geological database 114. In a preferred embodiment, the geological database is a distributed database having many sources. Preferably, the database contains historical listings of all geological data for a geographic location, such as surficial geology, soil plasticity, hydrology, topography, climate rating and seismic activity.

Administrator device 110 coordinates data collection from the various servers and databases in the system and conducts data analysis to develop and continuously update the recursive EFRM and generate alerts, as will be further described.

Referring to FIGS. 2A, 2B, 2C, 2D, 2E, and 2F, method 200 of data collection and EFRM generation and alert generation will be described. In a preferred embodiment, the method is performed by a software application running on administrator device 110 which communicates, as required, with the other servers and databases to send and recall necessary data.

At step 202, the method begins. At step 204 a county map is retrieved from local memory. In step 206, on the county map is digitized to determine the GPS coordinates of all points on the county line perimeter. At step 208, the county map is divided, to the extent possible, into equal 4,000,000 square foot sections referred to as "grid coordinates." The grid coordinates are specified by a set of longitude and latitude coordinates of all points on the perimeter of each section. One of skill will recognize that not all counties will necessarily be square. In a preferred embodiment, the grid coordinates are laid out in a best fit pattern to maximize the number of complete grid cells. Therefore, there may be a number of grid cells that are irregularly shaped, and/or have less than a complete 4,000,000 square foot coverage.

At step 209, a base recursive search frequency value is set.

At step 210, a maximum recursive search frequency value is set.

In step 211, weighting factors are set for the categories of surficial geology, expansive soils, soil hydrology, topography, climatic, and seismic activity.

In a preferred embodiment, the following global weighting factors are applied:

TABLE 1

| Risk Rating Category | Weighting Factor |
| --- | --- |
| Surficial Geology | 4 |
| Expansive Soils | 6 |
| Hydrology | 2 |
| Topography | 4 |
| Climatic | 3 |
| Seismic Activity | 1 |

The weighting factors form an important aspect of the invention because they set the priority of the risk factors which greatly effects the outcome of the calculation. The weighting factors are not arbitrary, but the result of many years experimentation and experience in defining the relative importance of each factor in the ERFM. Likewise, the rating factors and binning rules for all data categories, as will be further described, are not arbitrary, but rather based on careful meteorological, climate and geological research and observation conducted over the course of many years by the inventors.

At step 212, an initial set of grid coordinates is chosen for a particular 4,000,000 square foot section.

In step 214, surficial geological data for the grid coordinates is retrieved from the geological database. The data includes surficial geology characteristics for the grid coordinates. At step 215, the surficial geology rating factor is determined.

To determine the surficial geology rating factor, one preferred embodiment employs the Geological Atlas of Texas, prepared by The University of Texas, Bureau of Economic Geology (UTBEG) in 1987. The maps were digitized in 2002 by the United States Geological Survey (USGS) and Texas Natural Resources Information System (TNRIS) to provide a digital dataset containing the type and location of the various geologic formations present in the state. This map is used for all counties in the state. Of course, other maps may be used for other geographic areas.

The contribution of surficial geology to the EFRM is determined by calculating the number of unique geologic formations that occur within the model grid cells. The operating principle is that if a greater number of geological formations are present in a localized area, then these formations will have different soil characteristics and will therefore behave and swell differently in various environmental conditions. A preferred embodiment employs the following rules and rating factors to this dataset:

TABLE 2

Surficial Geology Rating Factors

| Number of Geological Formations Present | Surficial Geology Rating Factor |
|---|---|
| =1 | 1 |
| >1 | 2 |

In step 216, the rating factor is normalized for the grid coordinates. To normalize rating factor, each data value is multiplied by the percentage area of the grid coordinates to which it applies. The results are summed to arrive at an average or "normalized" value for the surficial geology rating factor for the set of grid coordinates.

In step 217, the expansive soils data for the grid coordinates are retrieved from the geological database. This data includes the plasticity index of the soil, and percentage of soil with that plasticity in the grid coordinates. At step 218, the expansive soils rating factor is determined.

In one example, Information on the expansive soils in Dallas County are obtained from the United States Department of Department of Agriculture's (USDA's) Natural Resource Conservation Service (NRCS) Soil Survey. There is a very large number of individually mapped soil units in this county, but they can be quantitatively characterized by their ability and propensity to swell with an increase in moisture content. The characterization is most easily expressed by the plasticity index of the soil, which is the difference between the liquid and plastic limits of the soil. The more plastic a soil (i.e., possessing higher plasticity), the more compressive and expansive its behavior. Of course, other sources of data on expansive soils can be applied.

The contribution of expansive soils to the EFRM is determined by binning the plasticity indices of the various soil units into ranges. The following rules and rating factors are applied to this dataset:

Expansive Soils Rating Factors

| Plasticity Index (%) | Expansive Soils Rating Factor |
|---|---|
| 0-10 | 1 |
| 10-20 | 2 |
| 20-30 | 3 |
| 30-40 | 4 |
| 40-50 | 5 |
| >50 | 6 |

In step 219, the expansive soils rating factor is normalized for the grid coordinates, as previously described.

In step 220, adjustments are made to account for water bodies. In a preferred embodiment, the normalized expansive soils data is corrected as follows:

Adjusted expansive soils rating factor=normalized expansive soils value (1−% of grid cell that is water)

In step 221, the hydrological data for the grid coordinates is retrieved from the geological database. The data produced includes the typical soil type and percentage of the grid coordinates to which it applies. At step 222, the soil hydrology rating factor is determined.

In a preferred embodiment, the soil hydrology data is taken from the NRCS Soil Survey including the Hydrologic Soil Group of each soil unit. Other soil hydrology data sources may be used. The contribution of soil hydrology to the EFRM is determined by associating the soil groups with the largest amounts of clay with the highest model risk due to their potential to shrink and swell. Four (4) hydrologic soil groups are used in this embodiment, which are summarized in the following table:

TABLE 4

Hydrologic Soil Factors

| Typical Soils | Characteristic | Soil Hydrology Rating Factor |
|---|---|---|
| Sands and gravels | High infiltration and low runoff potential | 1 |
| Silt loams and loams | Moderate infiltration and moderately well drained | 2 |
| Sandy clay loam | Slow infiltration | 3 |
| Clay loam through clay | Very slow infiltration and highest runoff potential | 4 |

At step 223, the hydrology rating factor is normalized for the grid coordinates, as previously described.

In step 224, adjustments are made to account for water bodies. In a preferred embodiment, the normalized hydrological data is corrected as follows:

Adjusted hydrological soil group rating factor=normalized hydrological soil group data (1−% of grid area that is water)

In another preferred embodiment, the banks of creeks, rivers and lakes and tidal seashore area are considered water area.

At step 225, the topology data for the grid coordinates is retrieved from the geological database. At step 226, the topology rating factor is determined.

One embodiment employs the United States Geologic Survey (USGS) National Elevation Dataset (NED) from 2013 to produce an accurate Digital Elevation Model (DEM) of all counties. Other sources of hydrologic data may be used. The resulting dataset is aggregated by a factor of 50 from an initial resolution of approximately 30 square feet to produce a coarser dataset that is not influenced by manmade structures, but rather represents a bare-earth generalized surface of natural topography.

Steeper topography is at a higher risk for differential movement since steeper slopes are generally less stable than flat topography. The percent slope of each of the cells in this dataset is then determined by evaluating the elevation of each of the four (4) neighboring cells. The neighboring cell with the greatest increase in elevation and the neighboring cell with the greatest decrease in elevation, as compared to the current cell, are used to calculate the percentage increase in slope according to the following equation.

$$\text{Percentage slope} = \frac{\text{greatest increase}}{\text{greatest increase} + \text{greatest decrease}} \quad \text{Eq. 1}$$

Where:
greatest increase=difference between the average elevation of the current cell and the average elevation of the neighboring cell having the largest increase in elevation;
greatest decrease=difference between the average elevation of the current cell and the average elevation of the neighboring cell having the largest decrease in elevation.

The contribution of topography to the EFRM is then determined by binning the average slope values of the dataset into ranges. The following rules and rating factors are applied to the dataset:

TABLE 5

Topography Rating Factors

| Slope (%) | Topology Rating Factor |
|---|---|
| <1 | 1 |
| 1-2 | 2 |
| 2-5 | 3 |
| 5-12 | 4 |
| >12 | 5 |

At step 227, the topology rating factor is normalized for the grid coordinates, as previously described.

At step 228, the climatic data for the grid coordinates is retrieved from the geological database. At step 229, the climate rating factor is determined.

The generalized regional climate of each county is taken into consideration by Climatic Ratings for the Continental United States, from the Building Research Advisory Board (BRAB) 1968 publication. This is a national scale dataset, so variations in the climatic rating over a much smaller area are typically small. The climatic rating is a measure of the severity of climate changes for each geographic region. The BRAB data includes a summation of the monthly gamma distribution values for 100 weather stations located in various regions of the United States. In general, the BRAB data may be considered the inverse of the variance in severe changes in rainfall data, and temperature data. For example, the lower the number of severe meteorological changes results in higher climatic rating. Likewise, the higher the number of severe meteorological changes results in a lower climatic rating. "Severe" in this context is understood to be a change of greater than 30%.

The climatic rating reflects the stability of the moisture content in an expansive soil. The lower the climatic rating the less likely that the climate will influence the shrink-swell of the soil. The contribution of climatic rating to the EFRM is determined by binning the various possible ratings into ranges. The following rules and rating factors are applied to this dataset:

TABLE 6

Climatic Rating Factors

| Climatic Rating | Climatic Rating Factor |
|---|---|
| <15 | 5 |
| 15-25 | 3 |
| 25-35 | 2 |
| 35-45 | 1 |
| >45 | 1 |

At step 230, the climatic rating factor is normalized for the grid coordinates, as previously described.

At step 232, the seismic fault data for the grid coordinates is retrieved from the geological database. At step 231, the general seismic activity data for the grid coordinates is retrieved from the geological database. At step 233, the seismic activity rating factor, which is composed of a combination of the seismic fault data and the seismic activity data, is determined.

The contribution of seismic activity to the EFRM using the seismic risk map produced by USGS in the 2014, 2% probability of exceedance in 50 years map of peak ground acceleration is also considered. Other sources of seismic data may be used. Peak ground acceleration (PGA) is equal to the maximum increase in velocity that occurs during an earthquake at a location, expressed as a fraction of standard gravity (g). As PGA increases, there is a higher likelihood of soil movement during an earthquake, since the potential for shaking increases. The following rules and rating factors are applied to this dataset:

TABLE 7

Seismic Activity Rating Rules

| PGA | Potential Damage | Seismic Activity Factor |
|---|---|---|
| <0.06 | None | 1 |
| 0.06-0.12 | Very Light | 2 |
| 0.12-0.18 | Light | 3 |
| >0.18 | Moderate | 4 |

The presence of active and inactive seismic faults is also considered. Seismic faults are geological areas where there is an increased risk of movement. The general concept is that the two sides of a fault can slip past each other or heave up or down. Active faults represent the highest potential for differential movement. The following rules are applied to this data set.

TABLE 8

Seismic Fault Rating Factors by Fault Presence

| Fault Condition | Seismic Fault Factor |
|---|---|
| No fault present | 0 |
| Inactive fault present | 2 |
| Active fault present | 3 |

The seismic activity rating factor is then calculated according to the following equation.

$$\text{seismic activity rating factor} = \text{seismic activity factor} + \text{seismic fault factor} \qquad \text{Eq. 2}$$

At step 234, the seismic activity rating factor is normalized for the grid coordinates, as previously described.

At step 235, the respective global weighting factors are applied to each of the normalized and adjusted rating factor values for each of the surficial geology, expansive soils, soil hydrology, topology, climatic, and seismic activity data categories. In a preferred embodiment, each weighting factor is multiplied by each of the normalized and adjusted rating factor values to arrive at weighted rating factor values, as will be further described.

Figure 2A:
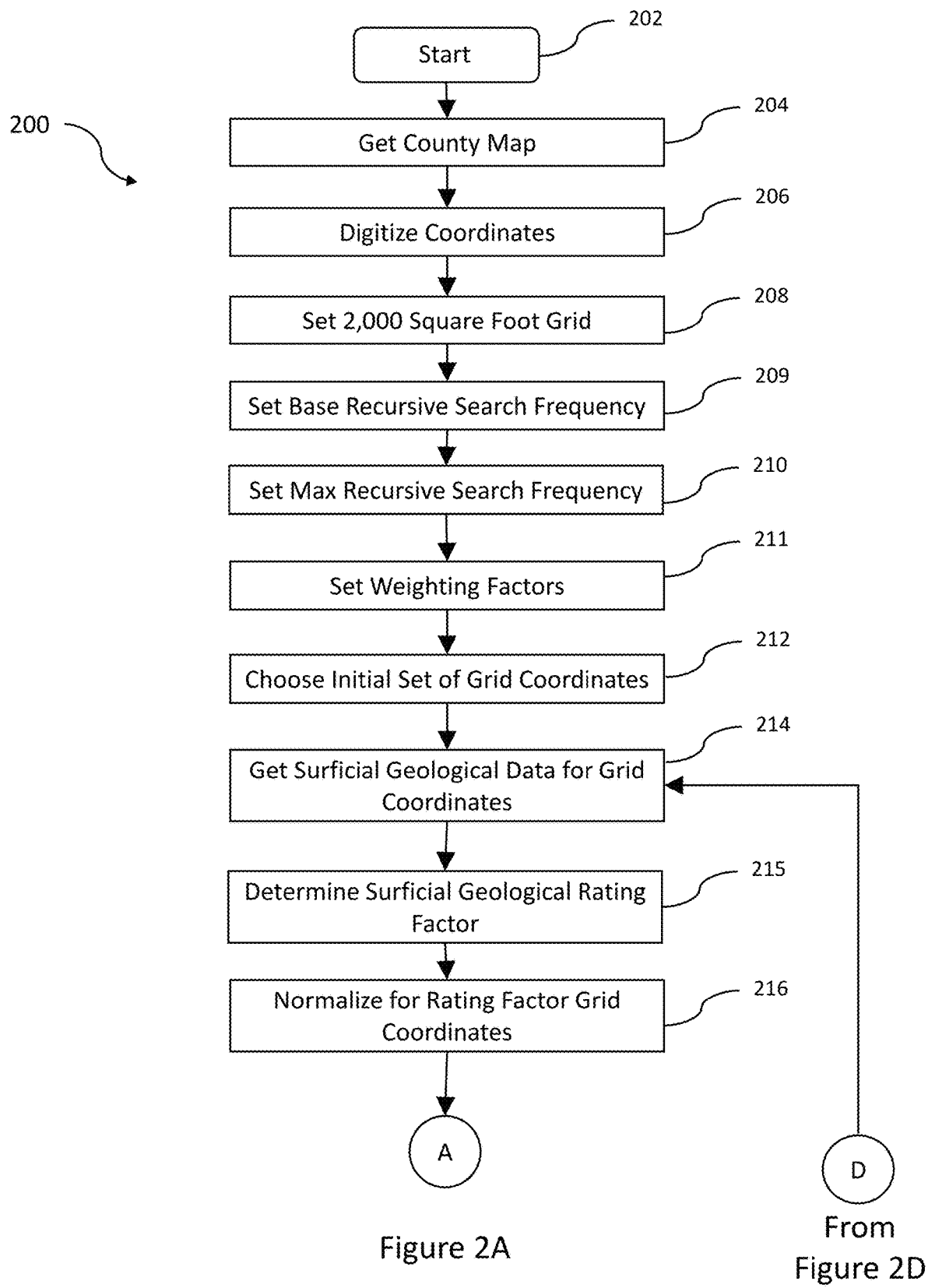
FIGS. 2A, 2B, 2C, 2D, 2E, and 2F are, collectively, a flow chart of a computer implemented method of a preferred embodiment.
Figure 2B:
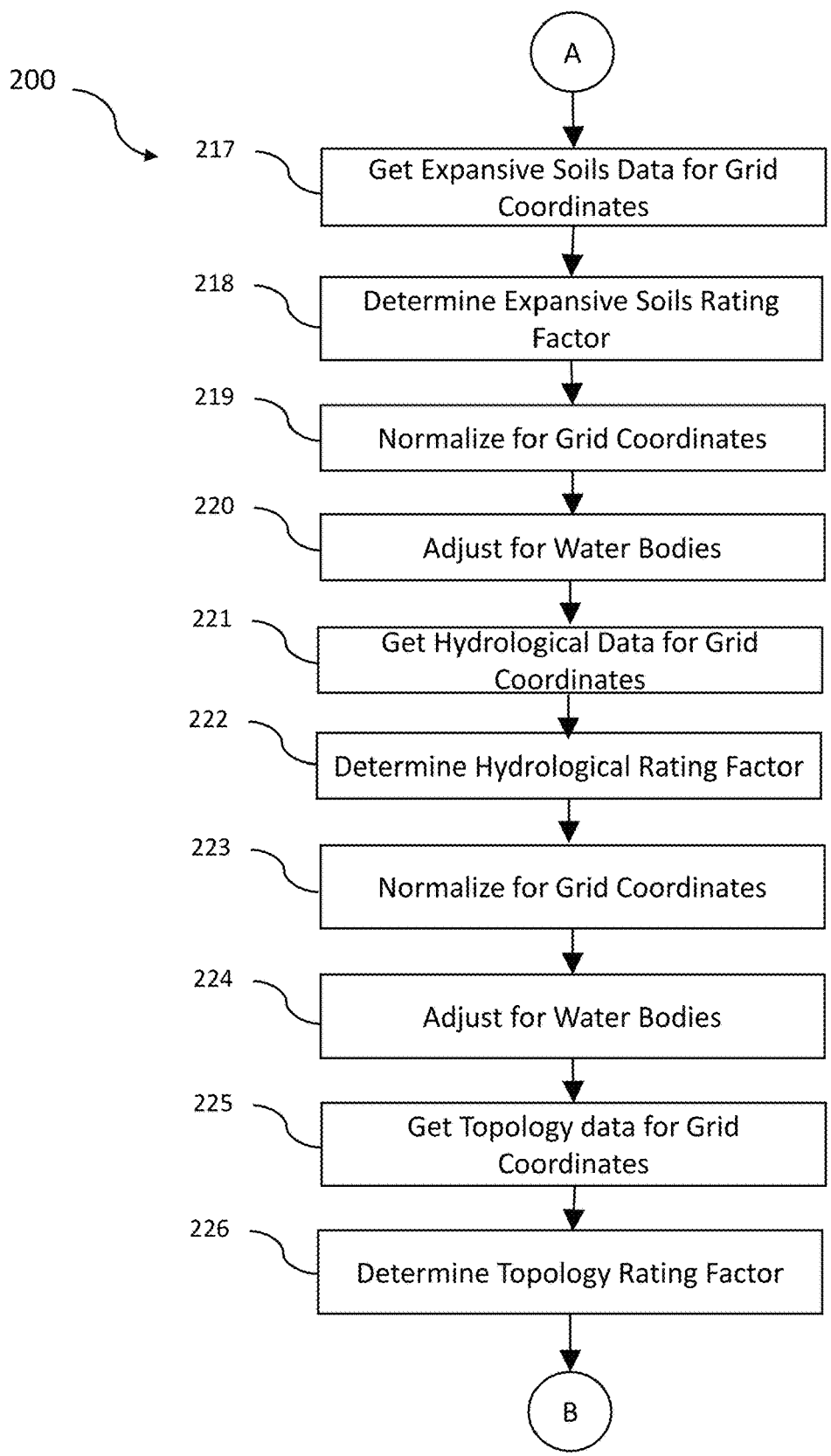
Figure 2C:
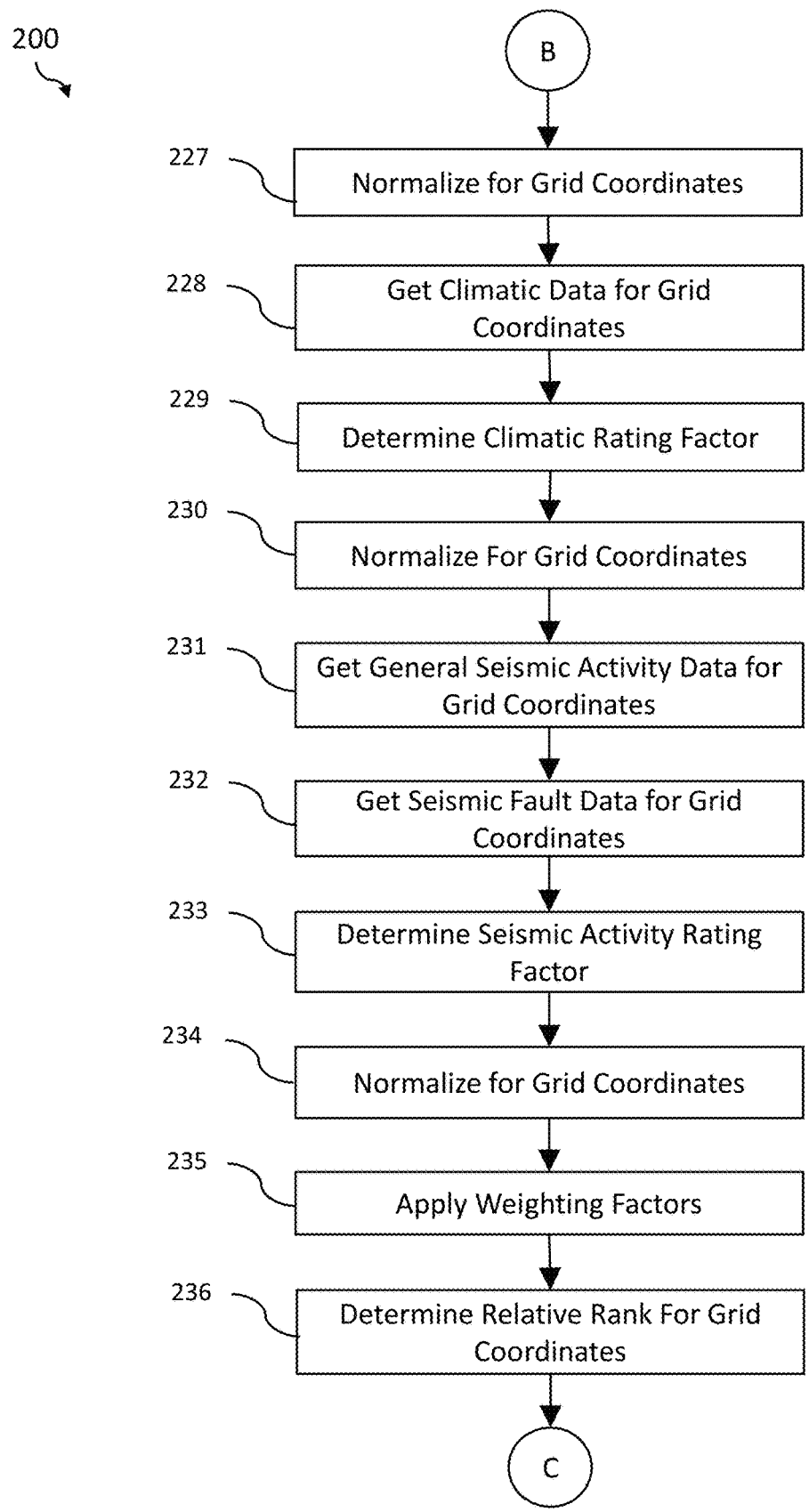
Figure 2D:
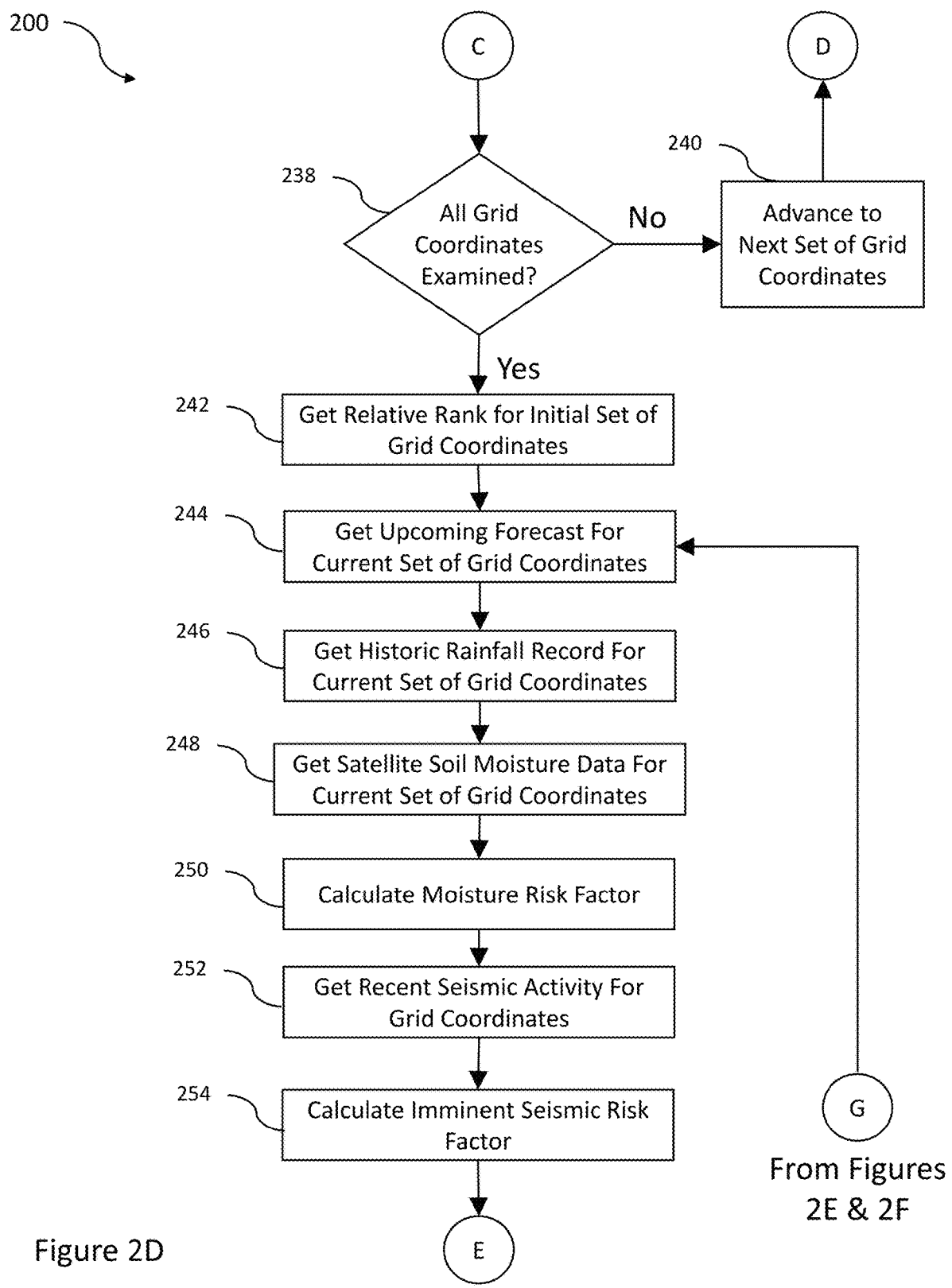
Figure 2E:
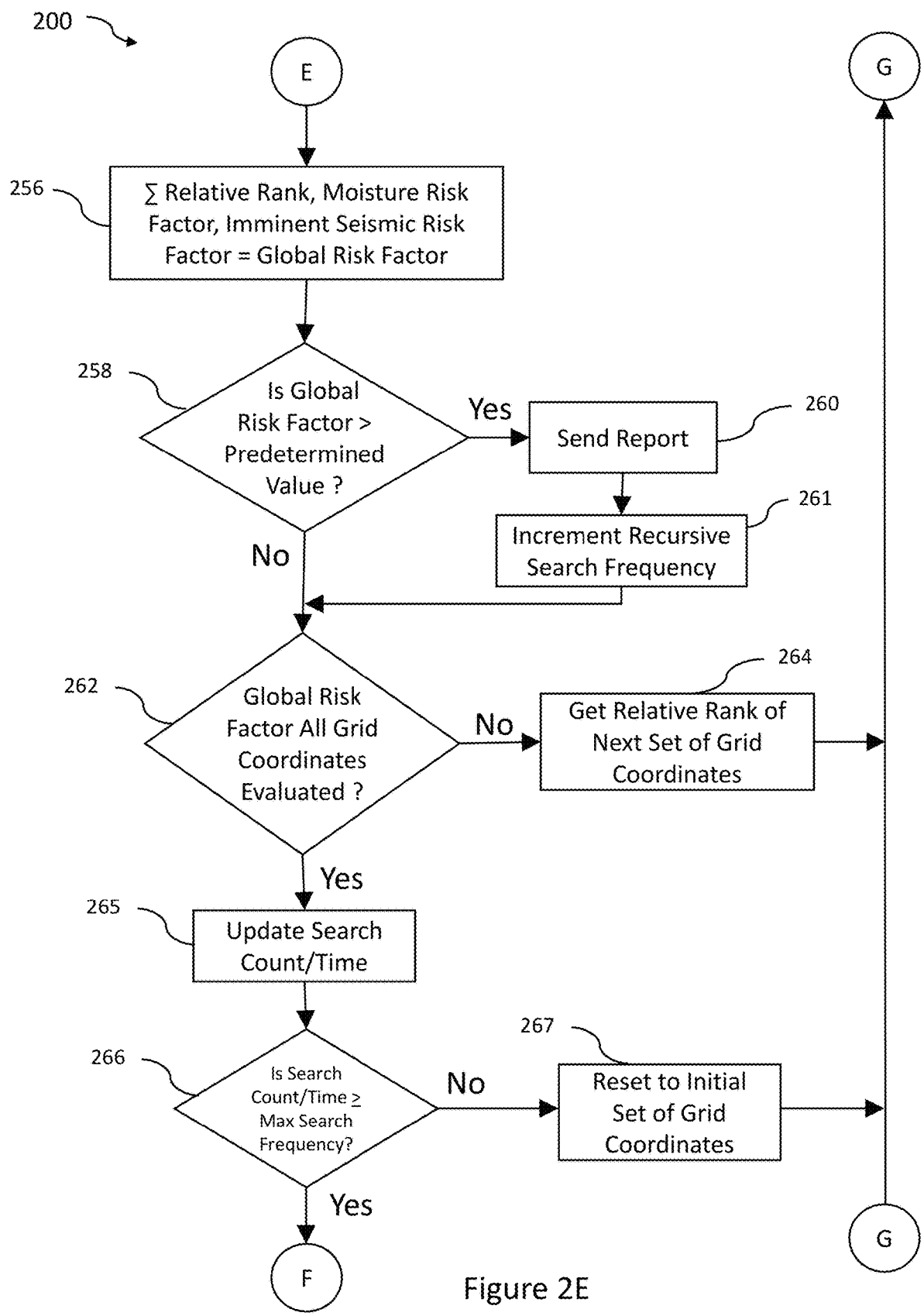
Figure 2F:
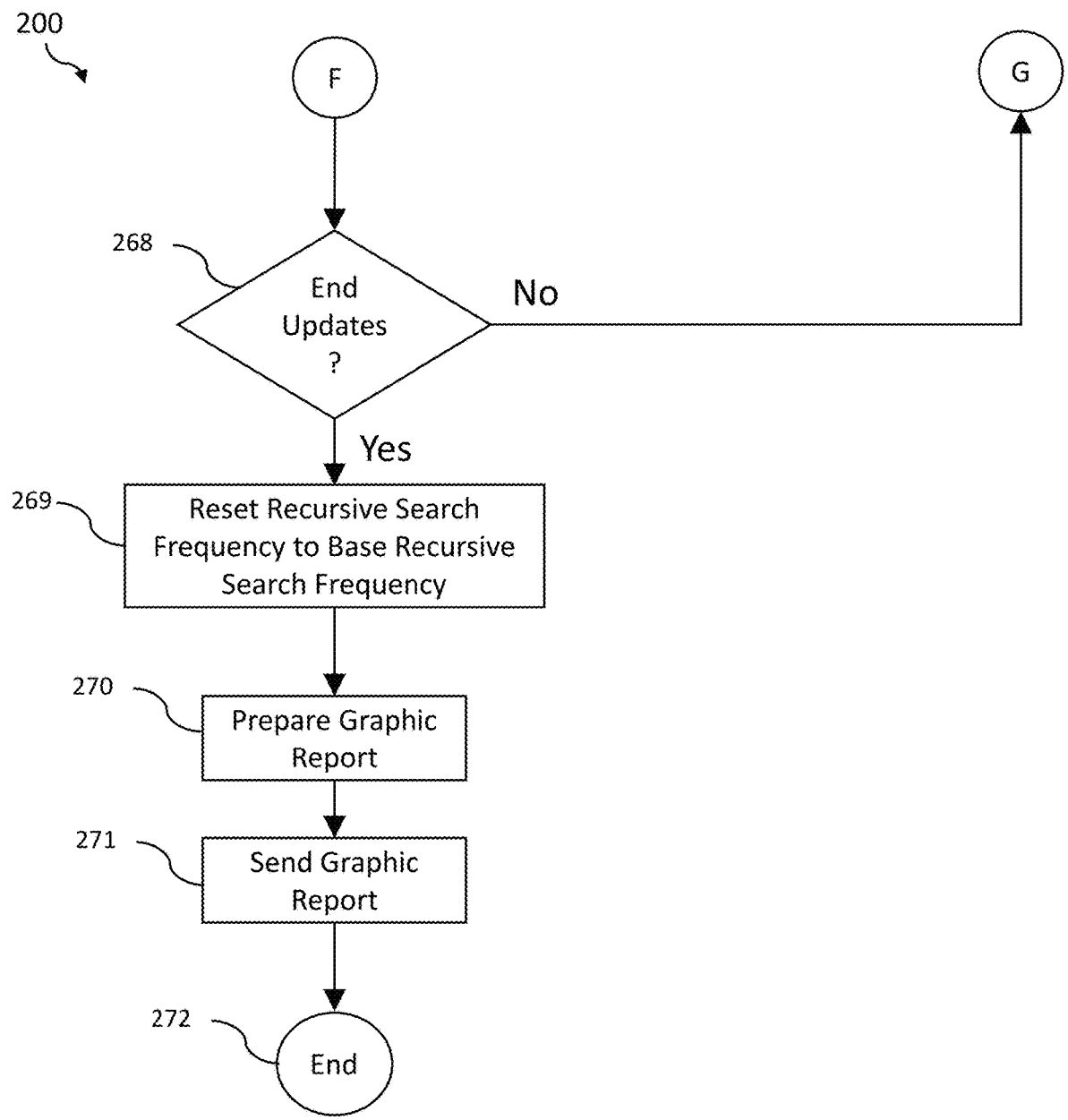
Figure 2G:
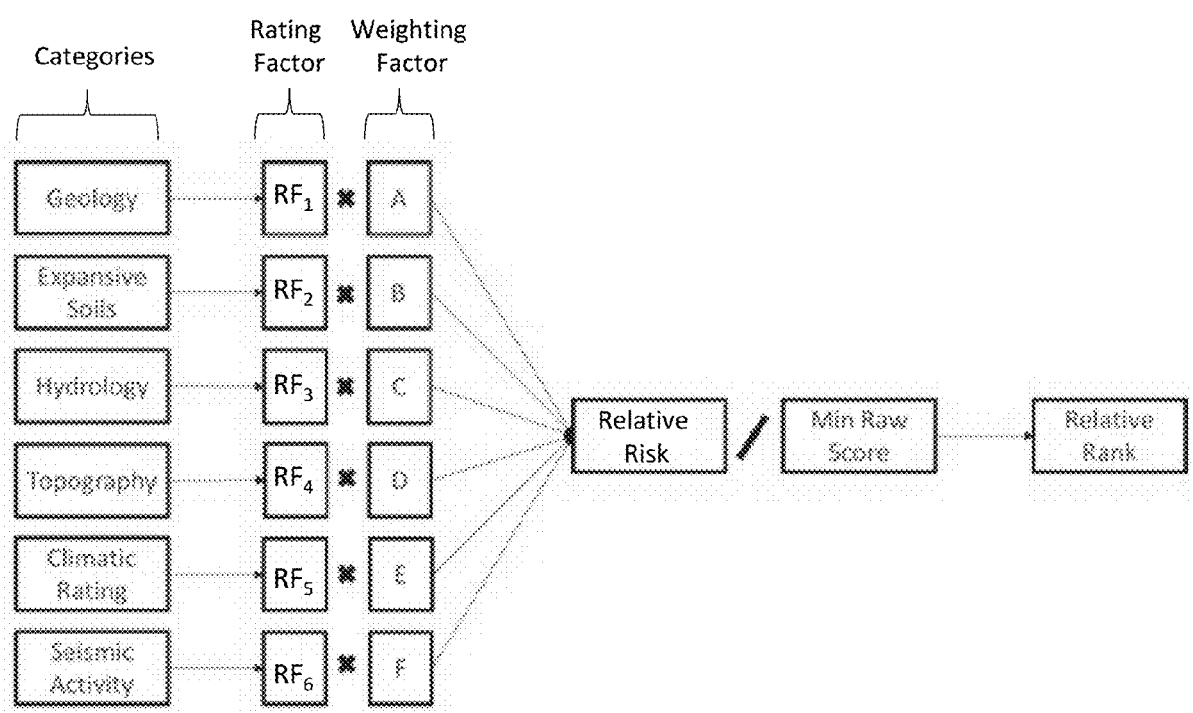
FIG. 2G is a graphical representation of a relative rank calculation.

At step 236, a relative rank for the grid coordinates is determined. The relative rank is calculated by summing the weighted rating factor values for each of the data categories to derive a relative risk which is then divided by the minimum raw score to derive a relative rank on a 1 to 5 scale. FIG. 2G is a flowchart of this calculation.

At step 238, the method determines whether or not a relative rank has been calculated for all specified grid coordinates. If not, then at step 240 the method advances to the next set of grid coordinates, and returns to step 214. If so, the method proceeds to step 242.

At step 242, the relative rank for an initial set of grid coordinates is retrieved.

At step 244, a future precipitation forecast for a predetermined future period of time, for the grid coordinates, is retrieved from the meteorological database. In a preferred embodiment, the future precipitation forecast is obtained from the United States National Oceanic and Atmospheric Association for the 4,000,000 square foot section defined by the set of grid coordinates. Other sources of forecast data may be used. In a preferred embodiment, the predetermined period of time is about 10 days. However, when large scale changes in meteorological events, such as heavy rain or vast temperature swings are expected, the predetermined period of time may be decreased to as little as several minutes, or less, in order to increase the sensitivity of the system to rapid meteorological changes.

At step 246, the historic precipitation data for the grid coordinates for a predetermined time period is retrieved from the meteorological database. Preferably the time period is 30 days, but can be shorter or longer depending on if shorter or longer term heavy rain or drought conditions are present.

At step 248, satellite soil moisture data for the grid coordinates is retrieved from the meteorological database. In a preferred embodiment, the satellite soil moisture data is obtained from the Texas Soil Observatory Network (TXSON) or the USDA Agriculture Soil Climate Analysis Network (SCAN). Other sources of satellite soil moisture data may be used.

At step 250, the moisture risk factor is calculated. The moisture risk factor accounts for the changes in the plasticity of the soil based on the current state of the soil and the likelihood that new rainfall will increase or decrease soil instability. In a preferred embodiment, the moisture risk factor is calculated by binning the forecast data, the historic rainfall and moisture data into the following categories.

TABLE 9

Forecast

| Rain Forecast Inches | | Forecast Rank |
|---|---|---|
| 0-1 | Low | 0 |
| 1-5 | Medium | 1 |
| >5 | High | 2 |

TABLE 10

Historic Rainfall

| Historical Rain Inches | | Historic Rain Fall Rank |
|---|---|---|
| 0-1 | Low | 0 |
| 1-5 | Medium | 1 |
| >5 | High | 2 |

TABLE 11

Current Moisture

| Current Moisture | | Current Moisture Rank |
|---|---|---|
| 0-10% | Low | 0 |
| 10-20% | Medium | 1 |
| 20-30% | High | 2 |

The rank assigned to each bin is important as it is used to estimate the effect of the various factors in the final analysis. The rank for each moisture category is then averaged to determine the moisture risk factor for the grid coordinates, according to the following equation.

$$\text{moisture risk factor} = \left(\frac{\text{forecast rank}}{3}\right) + \left(\frac{\text{historic rain fall rank}}{3}\right) + \left(\frac{\text{current moisture rank}}{3}\right) \quad \text{Eq. 3}$$

In step 252, the recent seismic activity data for the grid coordinates is retrieved. In a preferred embodiment, the recent seismic activity data is obtained from the Texnet Seismic Monitoring Program available from the Texas Bureau of Economic Geology. In another embodiment, recent seismic activity data may be obtained from the United States Geological Survey for the geographic area of interest. Other sources of seismic data may be used.

At step 254, the imminent seismic risk factor is calculated. The imminent seismic risk factor is calculated by binning the seismic rank. The seismic rank is determined by multiplying the total number of seismic events for the grid coordinates by the average magnitude of the events, for the previous predetermined time period, as follows.

seismic rank=$f \times m$

Where:
f=frequency of seismic activity events; and,
m=average magnitude of seismic activity events.

The seismic rank is then binned to arrive at the imminent seismic risk factor as shown in the following table.

TABLE 12

Seismic Rating Factor

| Seismic Rank | | Imminent Seismic Risk Factor |
|---|---|---|
| 0-1 | Low | 0 |
| 1-5 | Medium | 1 |
| 5-10 | High | 2 |

If more than one imminent seismic risk factor is present in the grid coordinates, then they are normalized, as previously described, to arrive at an average imminent seismic risk factor for the grid coordinates. In a preferred embodiment, the predetermined time period is 1 year. Other time periods may be used, depending on the frequency of seismic activity events in the area to be considered.

In step 256, the relative rank, moisture risk factor, and imminent seismic risk factor are summed to produce a global risk factor for the grid coordinates. At step 258, the method determines whether or not the global risk factor is greater than a predetermined value.

If so, the method proceeds to step 260 and sends a report from the administrator device to the client device. At step 261, the system increments the recursive search frequency by a predetermined amount. In a preferred embodiment, the recursive search frequency is increased by one cycle, but it may be increased by any number of cycles. Incrementing the recursive search frequency is important because it allows the system to account for drastic increases or decreases in meteorological events such as heavy rainfall, hurricanes, increased earthquake tremor activity, tsunamis or drought. The system then adapts to rapidly changing conditions in order to predict infrastructure risk scenarios efficiently by only updating rapidly changing data while not updating the more slowly changing data related to unaffected data categories, such as soil type and subsurface geological formations. The report may take the form of an emergency warning or a set of emergency action instructions for a set of geological sections where there is an imminent risk of property damage or loss of life, due to recent or predicted changes in meteorological conditions that raise the chance of a catastrophic failure of infrastructure. Examples of such instructions are shutting down natural gas flow in a pipeline forecast to rupture, or depowering an electricity substation where imminent geological slippage is predicted.

If not, the method proceeds directly to step 262.

At step 262, the method determines whether or not the relative ranks for all grid coordinates have been determined. If so, the method proceeds to step 265. If not the method proceeds to step 264. At step 264, the method retrieves the relative rank of the next set of grid coordinates and returns to step 244.

At step 265, the method updates a search count/time variable to monitor the search frequency. The search count/time variable is a measure of the current recursive search frequency. At step 266, the method determines whether or not the search count/time variable is equal or greater than the maximum recursive search frequency. If so, the method moves to step 268. If not, the method resets the initial set of grid coordinates at step 267 and returns to step 244.

At step 268, the method determines whether or not a request to end the update process has been received. If not, the method returns to step 244. If so, the method proceeds to step 269. At step 269, the recursive search frequency is reset to the base recursive search frequency. At step 270, a graphic report is prepared. In a preferred embodiment, a color range is applied to each relative rank for each grid cell to construct a map of relative ranks. At step 271, the graphic report is sent from the administrator device to the client machine. At step 272, the method ends.

In a preferred embodiment, the relative ranks are reported in a ranking system from 1 (interpreted as low risk of differential movement) to 5 (interpreted as very high risk of differential movement).

Examples

Two demonstrative counties (Dallas and Lubbock) were modeled with the EFRM process and demonstrate the novel process.

Dallas County, Surficial Geology

Figure 3A:
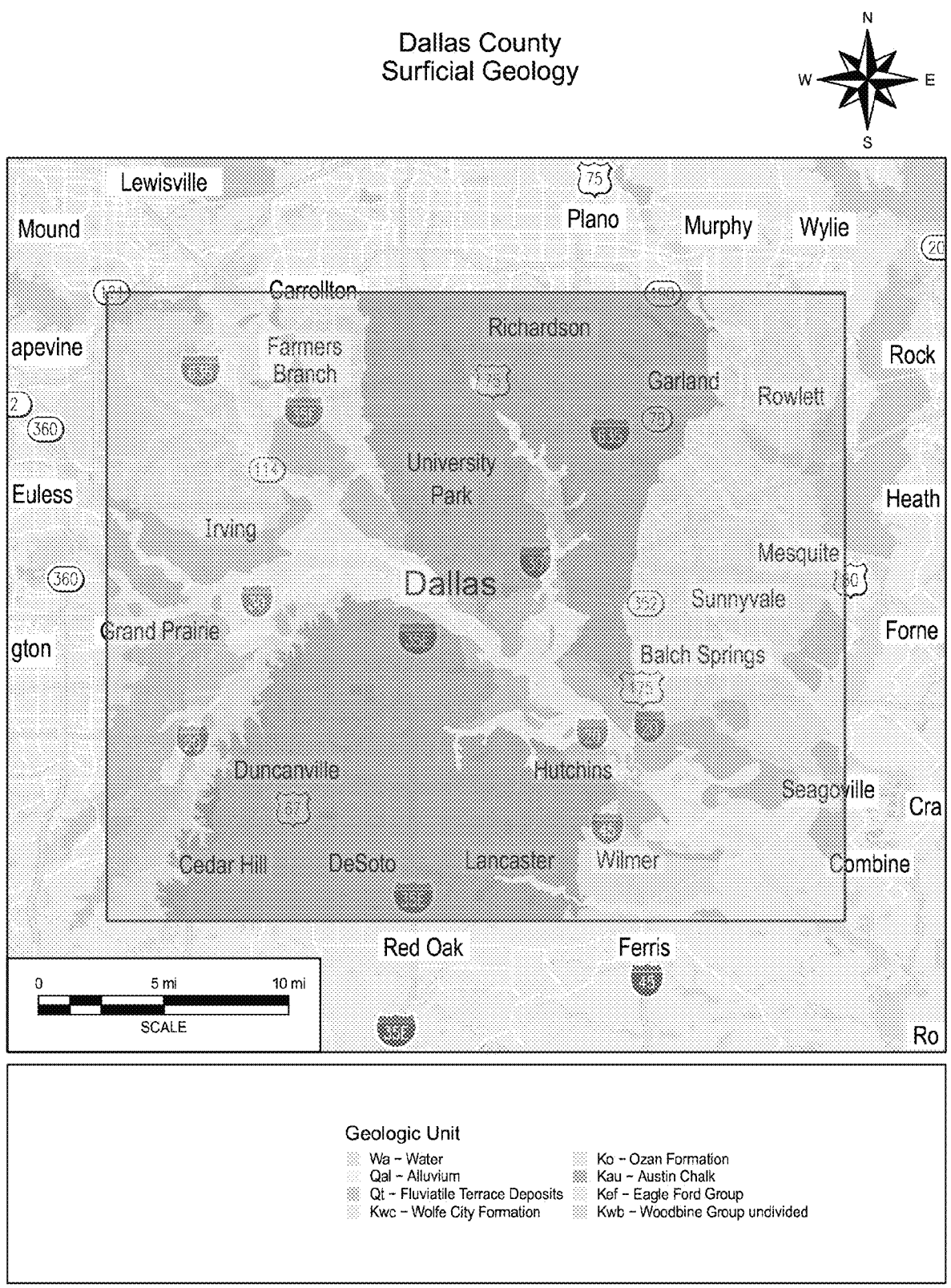
FIG. 3A is an exemplary map of surficial geology for a particular geographic area.

FIG. 3A is a visual representation of the geology in the area. In general, Dallas County is characterized by the following geologic units, listed from oldest to youngest:

Woodbine Formation

The Woodbine Formation is an Upper Cretaceous formation that consists of highly variable subsurface conditions with interbedded soil and rock strata including expansive clays and shaley clays, with clayey sands, sandy clays, sandstones, and shales.

Eagle Ford Formation

The Eagle Ford Formation, also referred to as the Eagle Ford Shale, is an Upper Cretaceous formation consisting of surficial dark yellow and grayish brown residual clays grading to yellowish brown to olive gray shaley clay. Harder gray shale is typically found at depth.

Austin Chalk Formation

The Austin Chalk Formation, or simply the Austin Chalk, is an Upper Cretaceous Formation that consists of surficial dark brown or gray clay underlain by yellowish calcareous clays which grade into tan and gray limestone. It weathers white. Upper and lower parts of the formation are mostly microgranular calcite, massive, with some interbeds and partings of calcareous clay. Thin bentonitic beds exist locally in the lower part, which also tends to form westward-facing light gray scarps. The Middle part is mostly thin-bedded marl with interbeds of massive chalk, locally burrowed, with light-gray marcasite-pyrite nodules common. In FIG. 3A, the Geologic Map of Dallas County, the formation is delineated into these Lower, Middle, and Upper members.

Ozan Formation (Locally named Sprinkle Formation, "lower Taylormarl") Clay, marl, calcareous content decreases upward, and sand increases upward, poorly bedded, montmorillonitic, some glauconite, phosphate pellets, and hematite and pyrite nodules, variable amount of silt-size quartz and calcite fragments, become more abundant upward, blocky with conchoidal fracture, light gray to brown, weathers light gray to grayish orange and white, develops poor fissility, marine fossils; thickness 115-775 feet.

Wolfe City Formation

Marl, sand, sandstone, and clay. Marl, sandy, silty, dark gray to light gray and brown, interbedded with thin sandstone lenses cemented by sparry fine to coarse-grained calcite, grain size and uncemented sand increases northward. Clay, glauconitic, phosphate and hematite nodules, dark gray to brown. Sand and sandy marl, fine grained, abundant calcareous sandstone concretions, light to medium gray, weathers yellowish gray, near middle, thin highly fossiliferous calcareous sandstone bed. Thickness up to 300 feet.

Fluviatile Terrace Deposits

Gravel, sand, silt, and clay, commonly with pebbles and cobbles of chert, quartzite, igneous rock, metamorphic rock, caliche, and at higher levels abraded Gryphaea. Quartz sand, cross bedded to massive, lenticular; reddish brown, pink, gray to light gray.

Alluvium

Floodplain deposits, lower course of Rio Grande, alluvium undivided. Clay, silt, sand, gravel, and organic matter. Silt and sand, calcareous, dark gray to dark brown. Sand mostly quartz. Gravel along Rio Grande includes sedimentary rocks from the Cretaceous and Tertiary and a wide variety of igneous and sedimentary rocks from Trans-Pecos Texas, Mexico, and New Mexico, including agate. Gravel in side streams of the Rio Grande mostly Tertiary rocks and chert derived from Uvalde Gravel which caps divides. Thickness up to 35 feet.

Expansive Soils

Figure 3B:
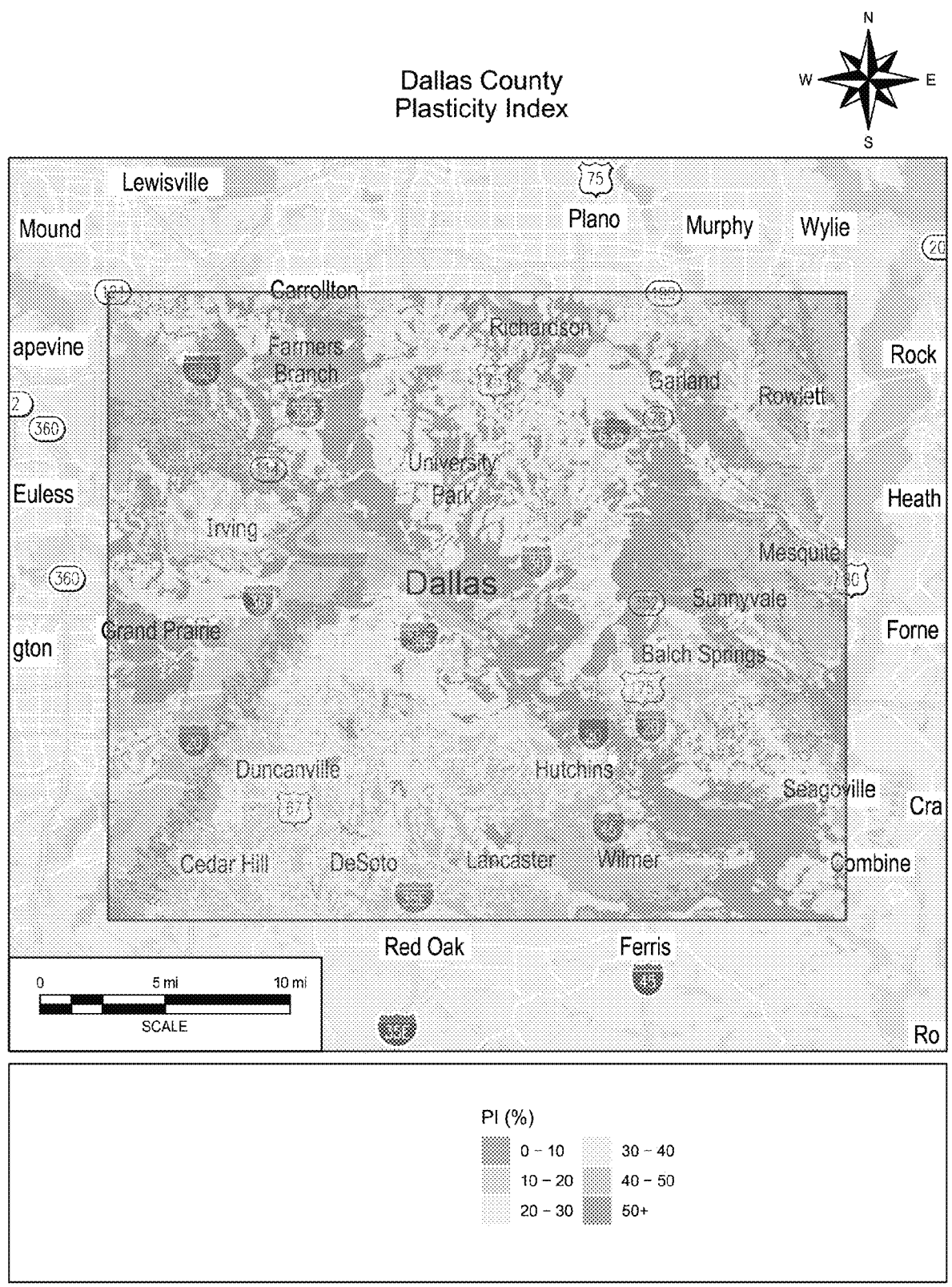
FIG. 3B is an exemplary map of plasticity index for a particular geographic area

There is variability in propensity of soils to expand in Dallas County. Most of the Quaternary deposits and the Taylor and Eagle Ford Formations have a high PI and are likely to expand, while the Austin Member has a moderate to low PI and is less likely to expand, as shown in FIG. 3B.

Soil Hydrology

Figure 3C:
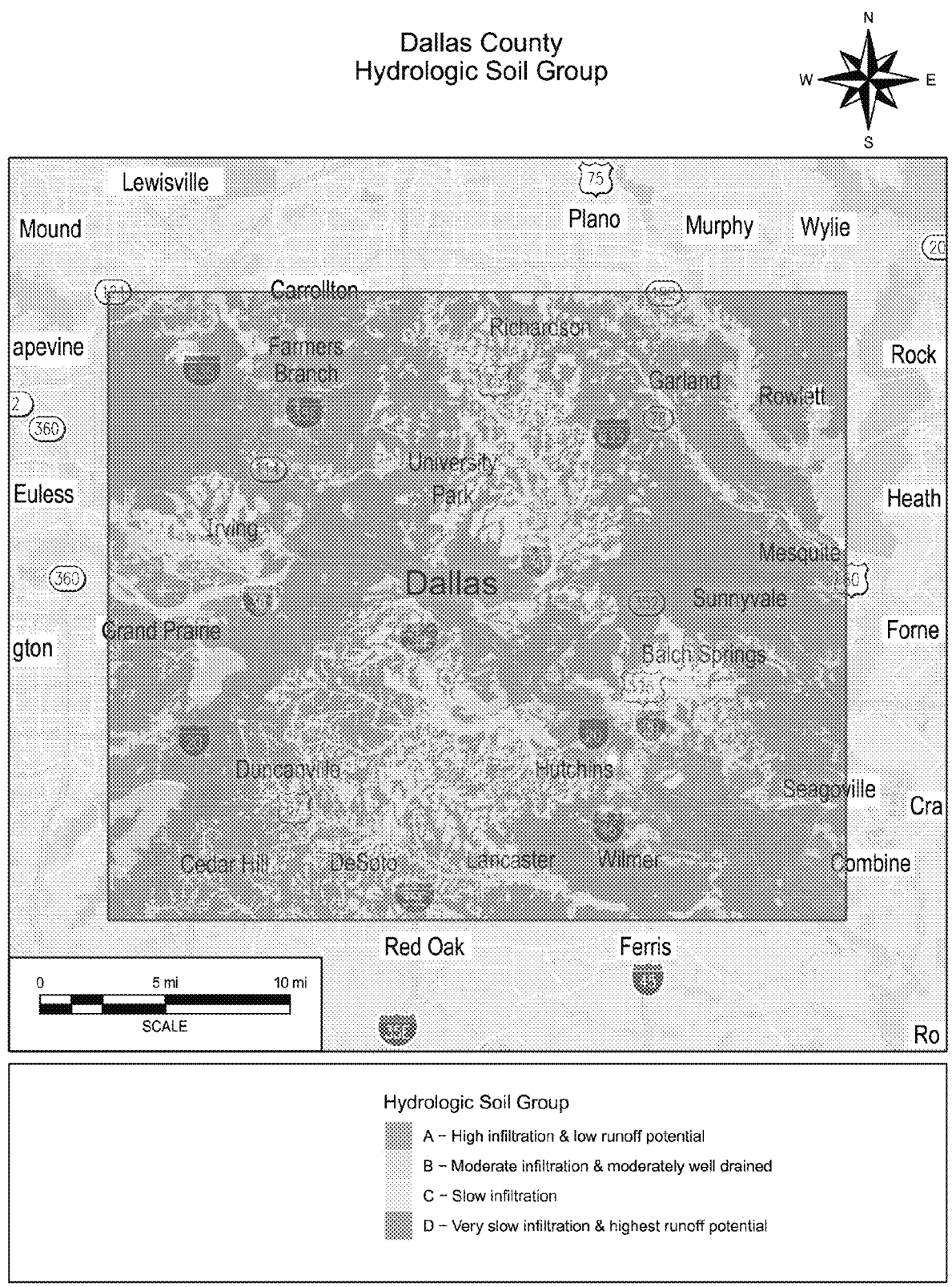
FIG. 3C is an exemplary map of soil hydrology for a particular geographic area.

Dallas County is dominantly hydrologic soil group D, which means the soil is dominantly clay. This means that the soil is likely to shrink and swell according to changes in moisture content. In the middle of the county there are large portions of hydrologic soil groups B and C, FIG. 3C shows these results.

Topography

Figure 3D:
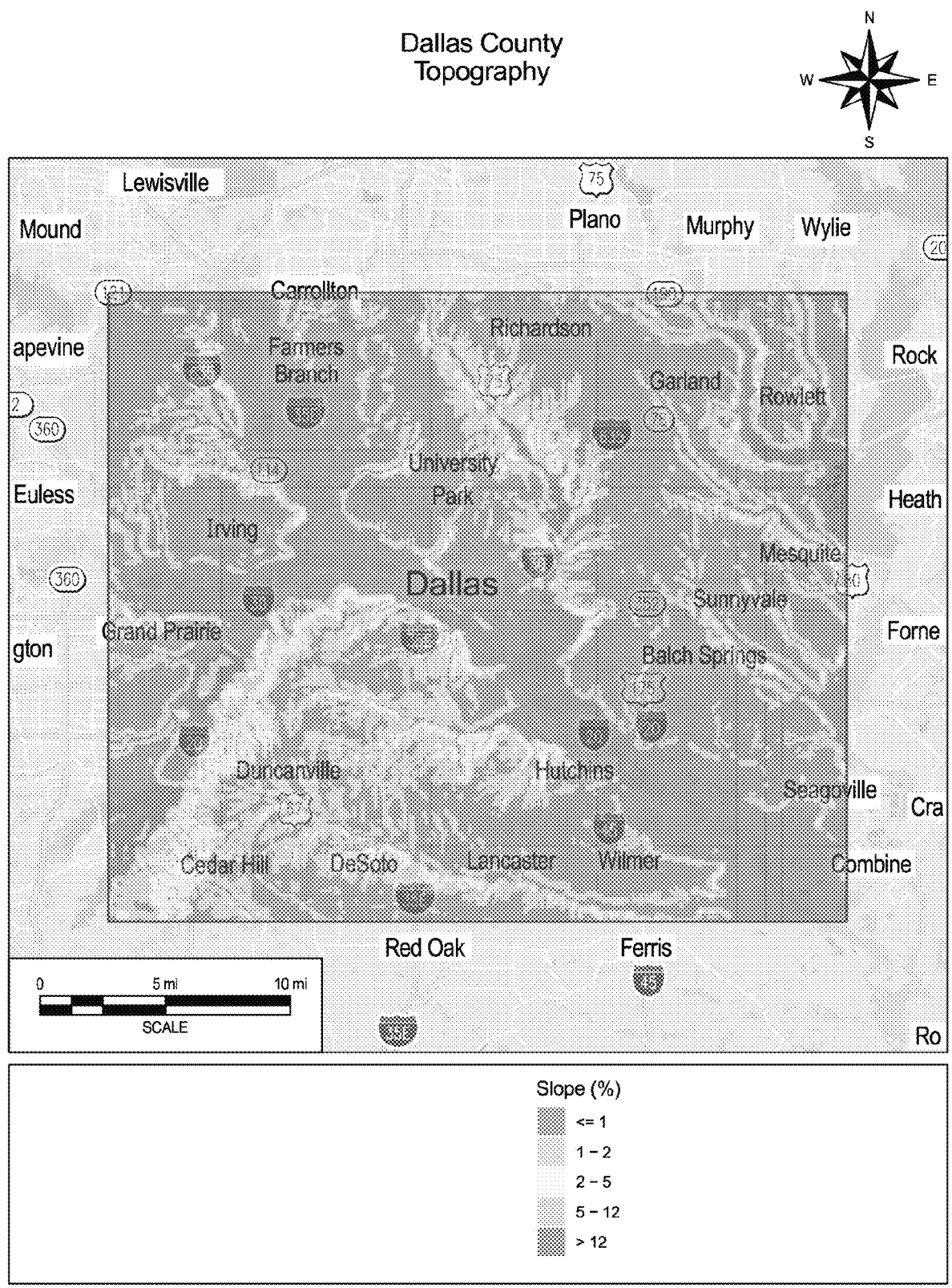
FIG. 3D is an exemplary map of topography for a particular geographic area.

As shown in FIG. 3D, the topography in Dallas County is largely flat near the Trinity River and its surrounding banks. Away from the river there are some steeper slopes in the northeastern and southern portion of the county. However, the county is dominantly slopes less than 5%.

Climatic Rating

Figure 3E:
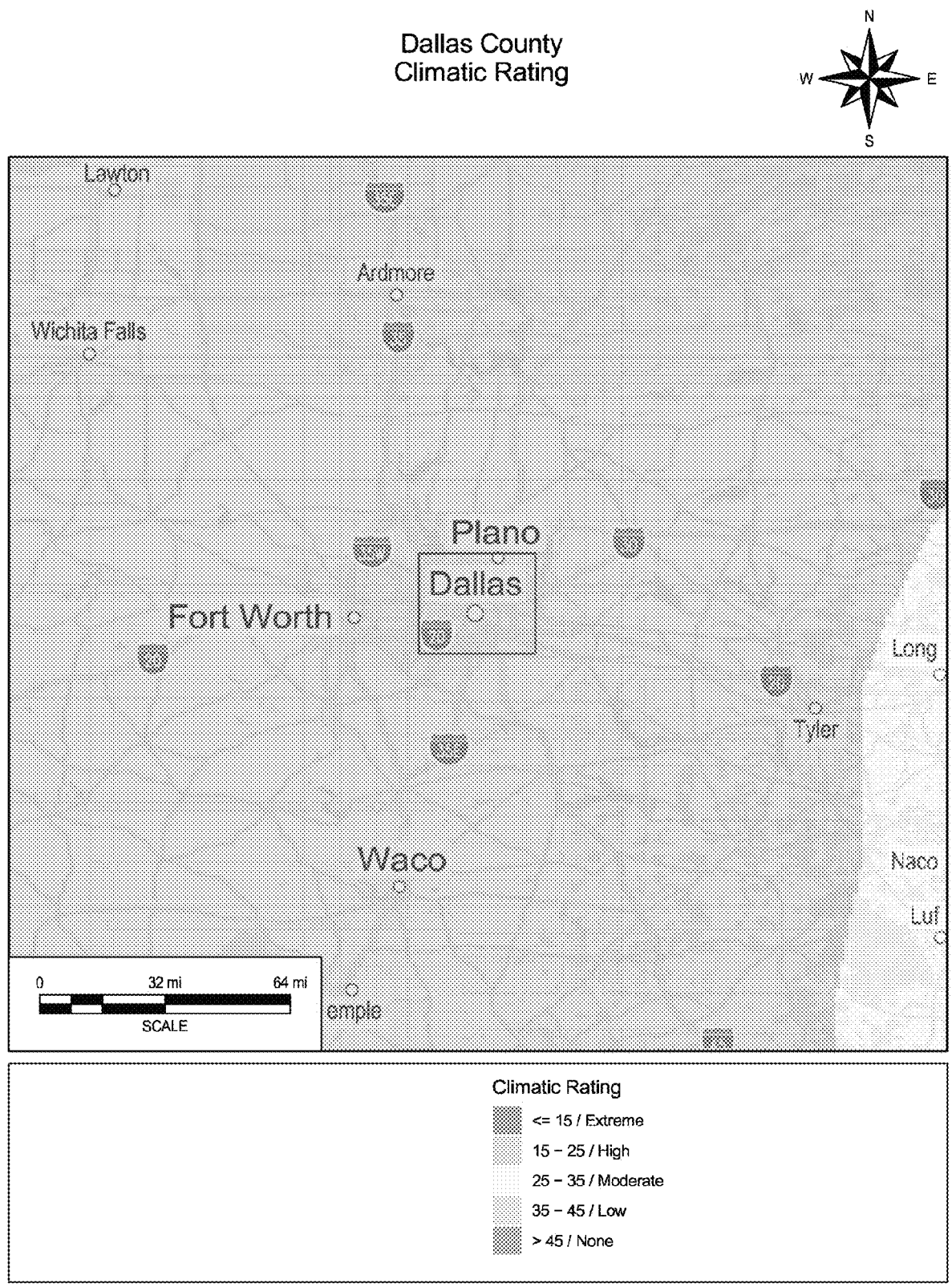
FIG. 3E is an exemplary map of climatic rating for a particular geographic area.

All of Dallas County has a value of approximately 20, which is defined by the BRAB as a high influence of climate for shrink-swell. These results are presented in FIG. 3E.

Seismic Activity

Figure 3F:
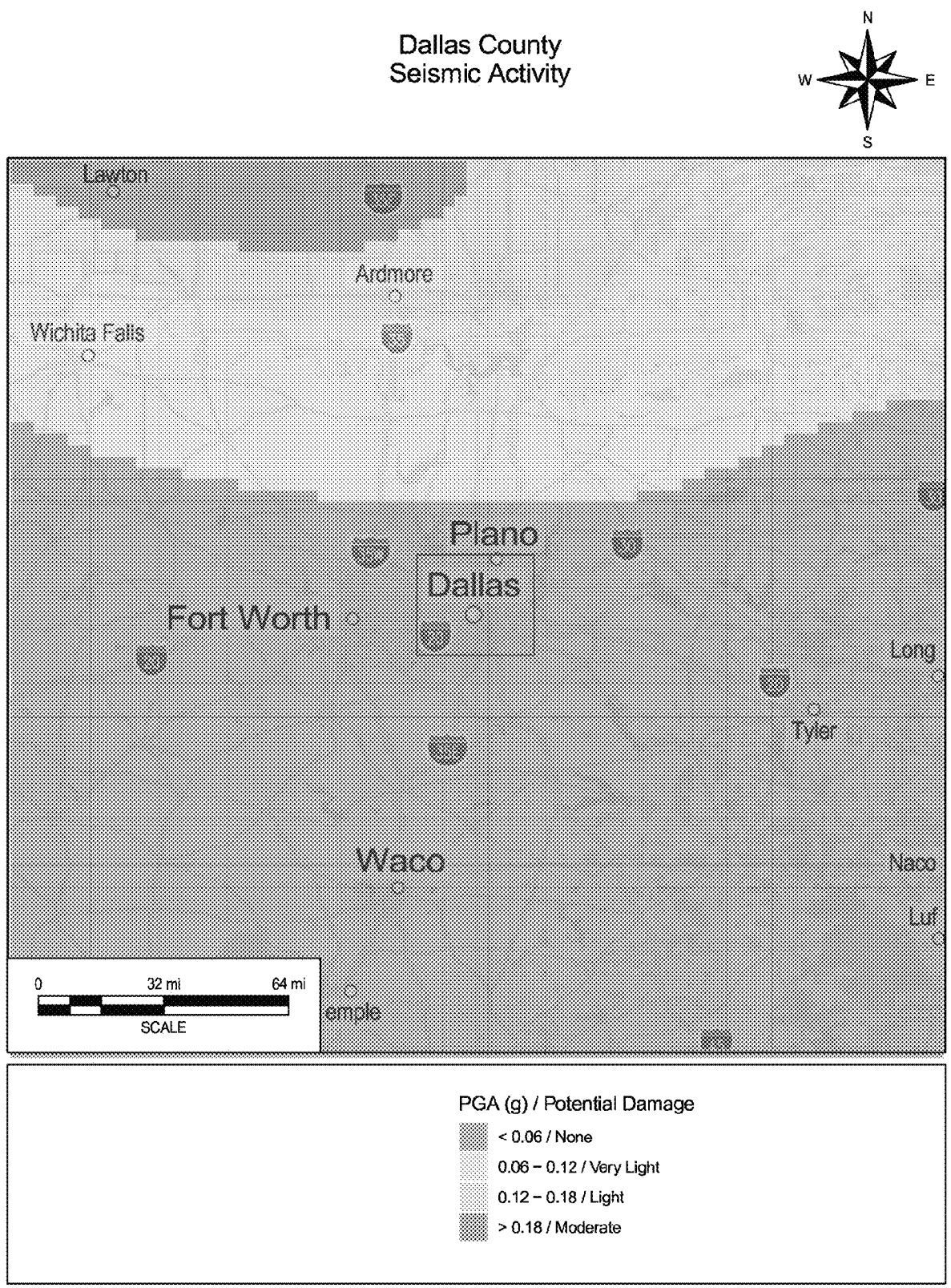
FIG. 3F is an exemplary map of seismic activity for the United States.

Dallas County has no faults present, active or otherwise, so there is no contribution to the EFRM from this factor. FIG. 3F communicates the seismic activity zones considered in this analysis. All of Dallas County is less than a PGA of 0.06 so there is no potential damage expected from an earthquake.

Model Calculation

Figure 3G:
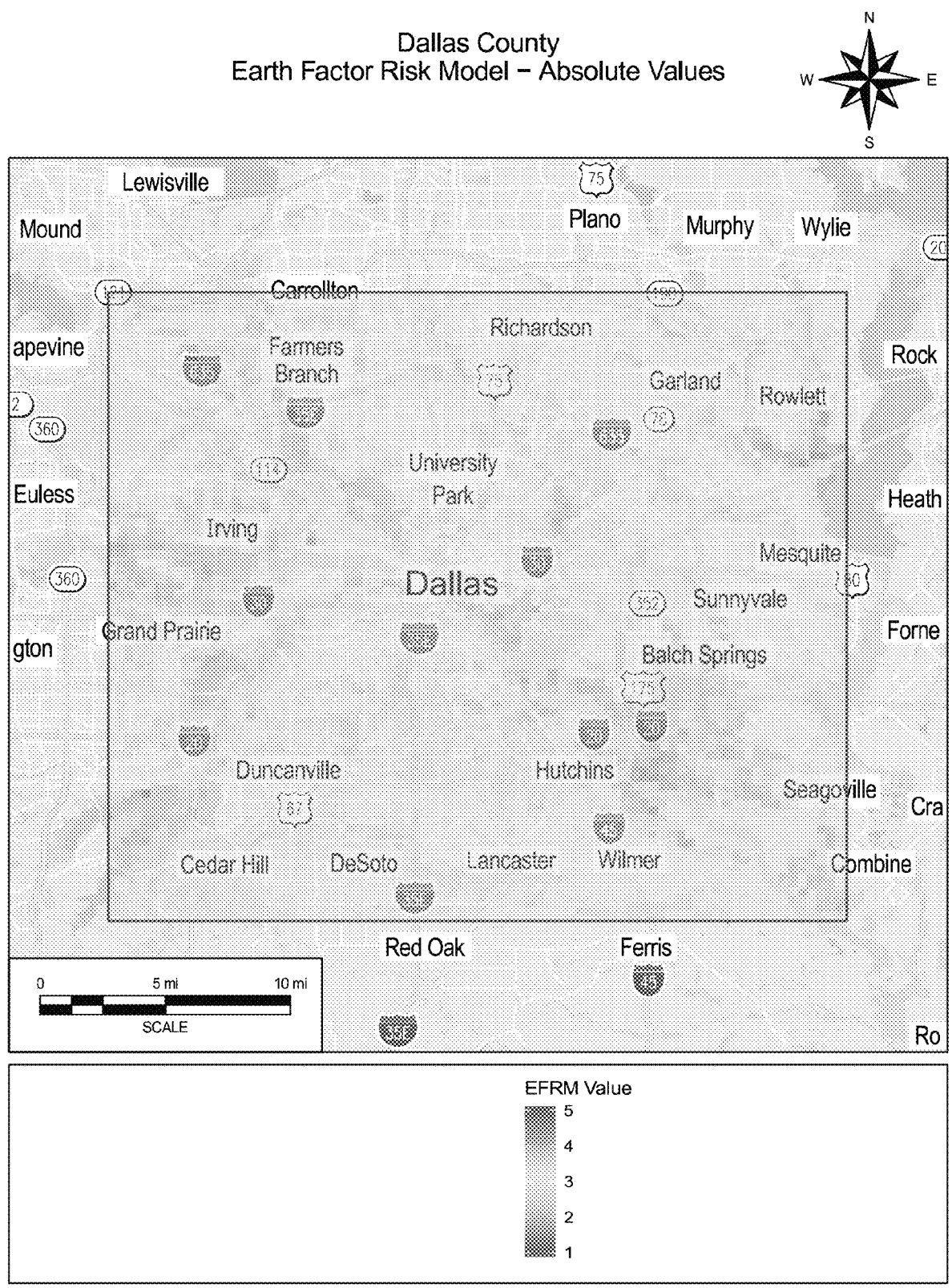
FIG. 3G is an exemplary grid of earth factor risk model as used in the system for a particular geographic area.
Figure 3H:
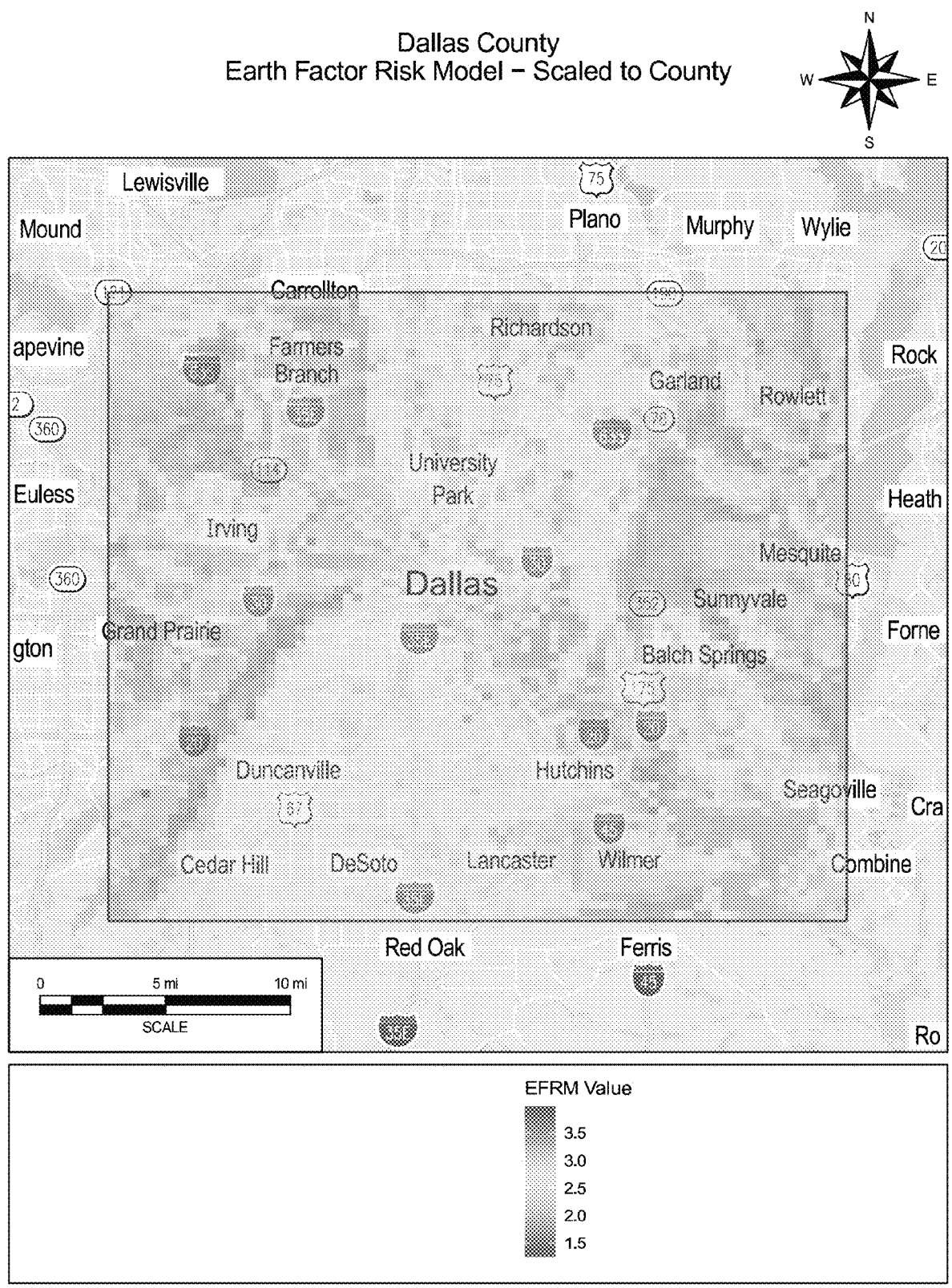
FIG. 3H depicts an exemplary grid of earth factor risk model as used in the system scaled to county for a particular geographic area.

FIGS. 3G and 3H show the final gridded EFRM output. FIG. 3G shows values colored using a scale that is directly comparable to any analyses in other counties; that is, EFRM rankings in Dallas County all occur within the 1.0-3.91 range, whereas the model has possible values from 1.0-5.0. Therefore, FIG. 3G has been colored as if it had values ranging from 1.0-5.0. In contrast, FIG. 3H has been colored with 3.91 as a maximum value, which communicates the differences between neighboring grid cell values with a higher resolution but does not allow the figure to be compared to surrounding counties. There are some clusters of high-risk cells; the northern portion of the county has the most high-risk areas clustered together. The average EFRM value for the county is 2.83.

Lubbock County, Surficial Geology

Figure 4A:
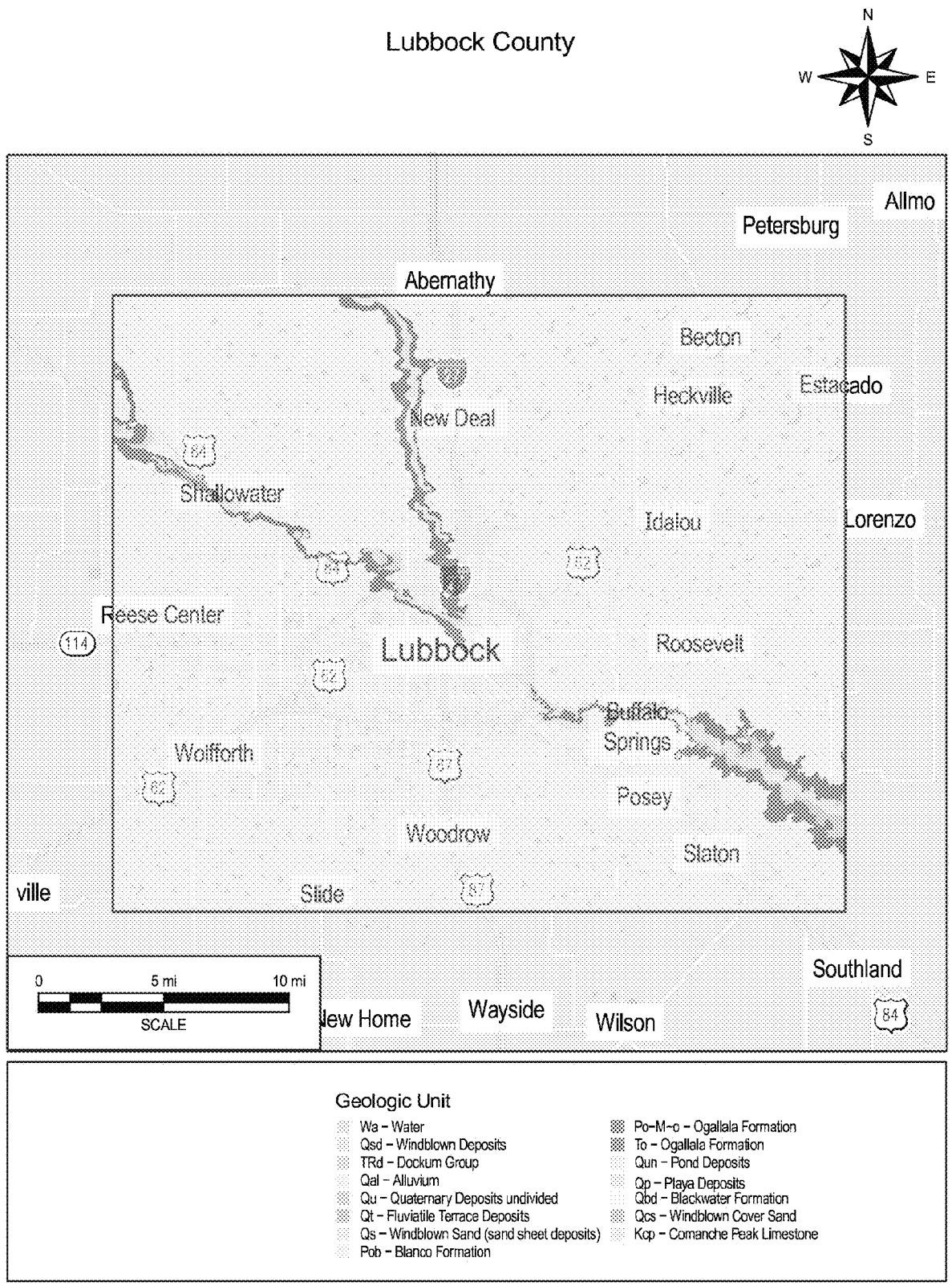
FIG. 4A is an exemplary map of surficial geology for a particular geographic area.

FIG. 4A is a visual representation of the geology in the area. In general, Lubbock County is characterized by the following geologic units, listed from oldest to youngest:

Windblown Deposits/Windblown Sand/Windblown Cover Sand

Fine to coarse, round to sub-round, windblown sand consisting mostly of quartz grains.

Dockum Group

The Dockum Group is a continental redbed sequence deposited unconformably on Upper Permian formations. Consists of shale, sandstone, siltstone, limestone, and gravel, but mostly shale, miceous, thinbedded, variegated. Thickness may be up to 300 or 400 feet.

Alluvium

Clay, silt, sand, gravel, and organic matter. Silt and sand, calcareous, dark gray to dark brown. Sand mostly quartz.

Quaternary Deposits Undivided

General conglomeration of other Quaternary deposits present on the map sheet.

Fluviatile Terrace Deposits

Gravel, sand, silt, and clay. Commonly with pebbles and cobbles of chert, quartzite, igneous rock, metamorphic rock, and caliche. Quartz sand, cross bedded to massive, lenticular; reddish brown, pink, gray to light gray.

Blanco Formation

The Blanco Formation consists of sand, clay, limestone, and gravel. The unit is coarser with more gravel toward the margin of deposit; it weathers glaring white. The sand component is fine to medium grained quartz, bedded to massive, light greenish gray, white, and gray. The clay component is silty, sandy, bentonitic, and calcareous in part. The limestone component is white, flaggy, and thinbedded. Molluscan and vertebrate fossils are present. Thickness is up to 75 feet, but pinches out laterally.

Ogallala Formation

The general subsurface conditions of the Ogallala Formation generally consist of fluviatile sand, silt, clay, and gravel capped by caliche.

Pond Deposits

A gastropod-bearing sandy silt and silty clay, gray to light gray. The unit is deposited in ponds and shallow swales.

Playa Deposits

Clay and silt, sandy, gray, in shallow depressions; the unit weathers light gray. Ephemeral lakes and ponds are common in the wet season.

Blackwater Formation

The Blackwater Draw Formation typically consists of sand, fine to medium grained quartz, silty, calcareous, caliche nodules, massive, grayish-red; distinct soil profile; thickness 25 feet, feathers out locally.

Comanche Peak Limestone

The Comanche Peak Limestone is a medium gray, poorly bedded limestone and clayey limestone, argillaceous, with thin shale interbeds. It is very finely crystalline and in the upper part is a clastic limestone. It may be very fossiliferous, with thicknesses of 40-60 feet.

Expansive Soils

Figure 4B:
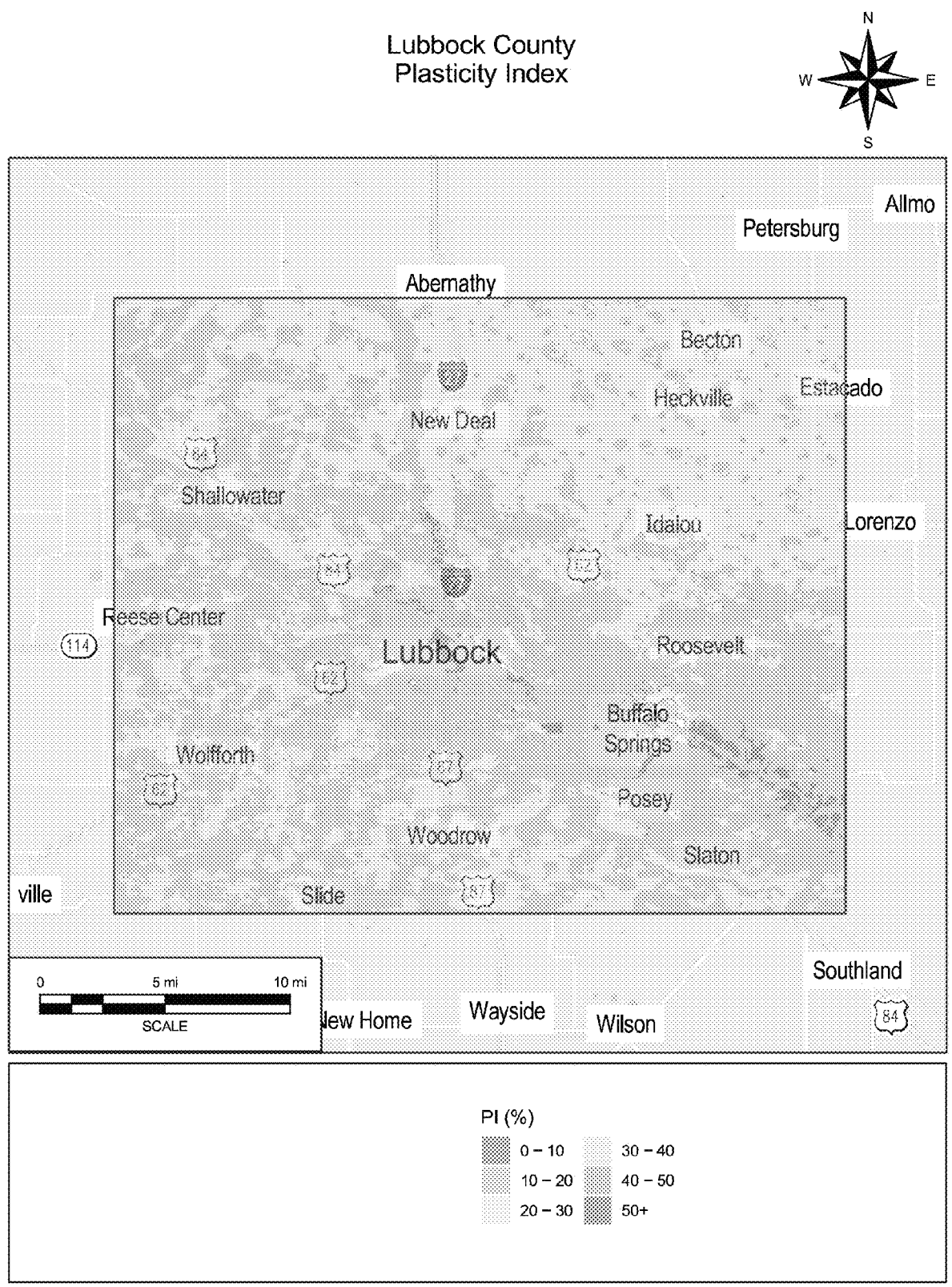
FIG. 4B is an exemplary map of plasticity index for a particular geographic area.

There is variability in propensity of soils to expand in Lubbock County. Many of the Quaternary and playa deposits have a high plasticity index (PI) and are likely to expand (as seen by elevated "spots" throughout the county), while most of the fluviatile deposits are a moderate to low PI and are less likely to expand, as shown in FIG. 4B.

Soil Hydrology

Figure 4C:
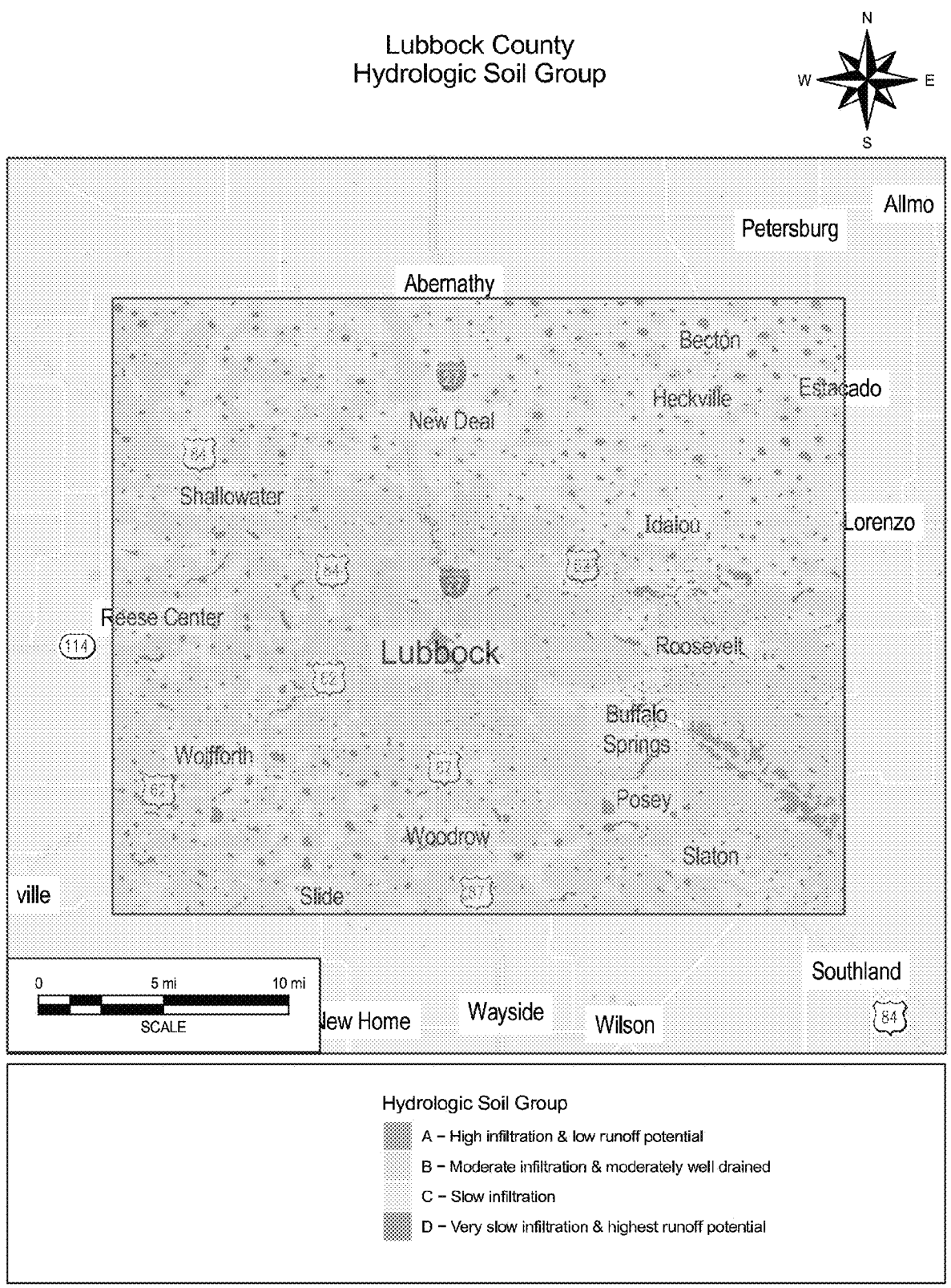
FIG. 4C is an exemplary map of soil hydrology for a particular geographic area.

Lubbock County is dominantly hydrologic soil group B, which means the soil is sandy and silty. This means that the soil is less likely to shrink and swell according to changes in moisture content. However, zones of hydrologic soil group C are present in the northern part of the county and "spots" of hydrologic soil group D are present throughout. FIG. 4C shows these results.

Topography

Figure 4D:
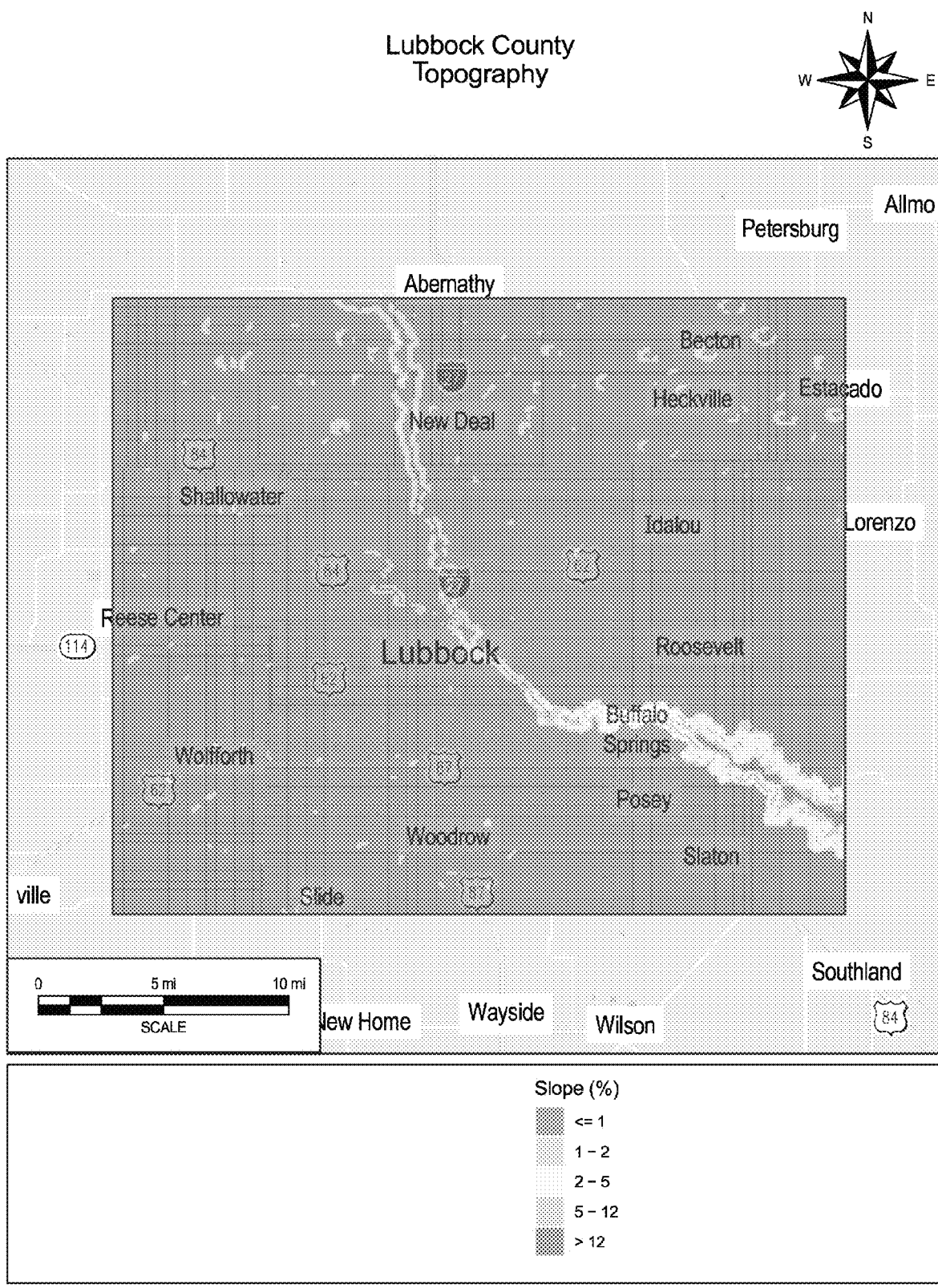
FIG. 4D is an exemplary map of topography for a particular geographic area.

As presented in FIG. 4D, the topography in Lubbock County is largely flat except for near the Brazos River tributaries. Along the banks, slopes are slightly inclined; however, the rest of the county is almost entirely sloped less than one percent.

Climatic Rating

Figure 4E:
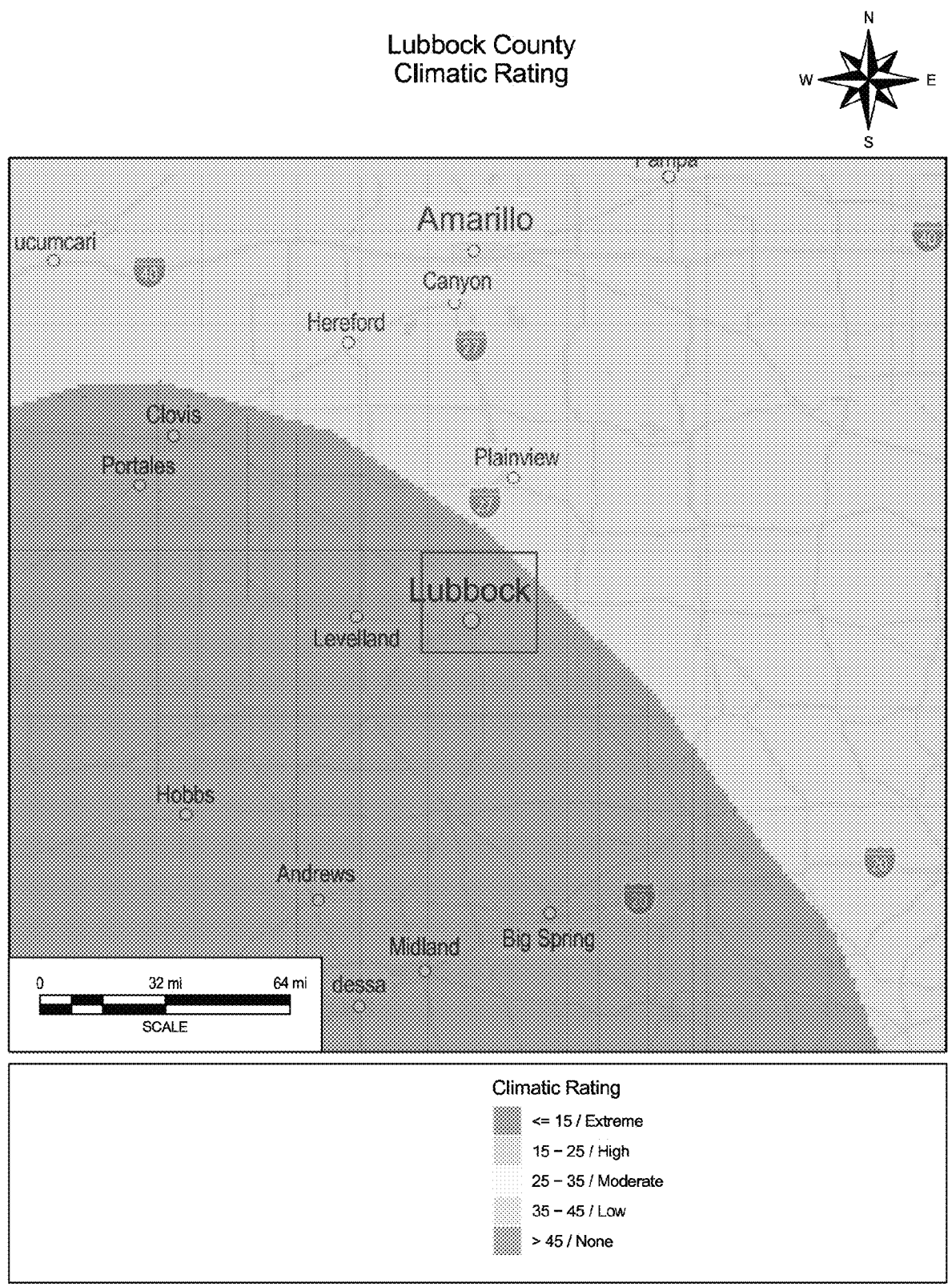
FIG. 4E is an exemplary map of climatic rating for a particular geographic area.

The southwestern half of Lubbock County has a climatic rating of less than or equal to 15, which is defined by the BRAB as an extreme influence of climate for shrink-swell. The northeastern half of the county is 15-25, which is defined as high influence. These results are presented in FIG. 4E.

Seismic Activity

Figure 4F:
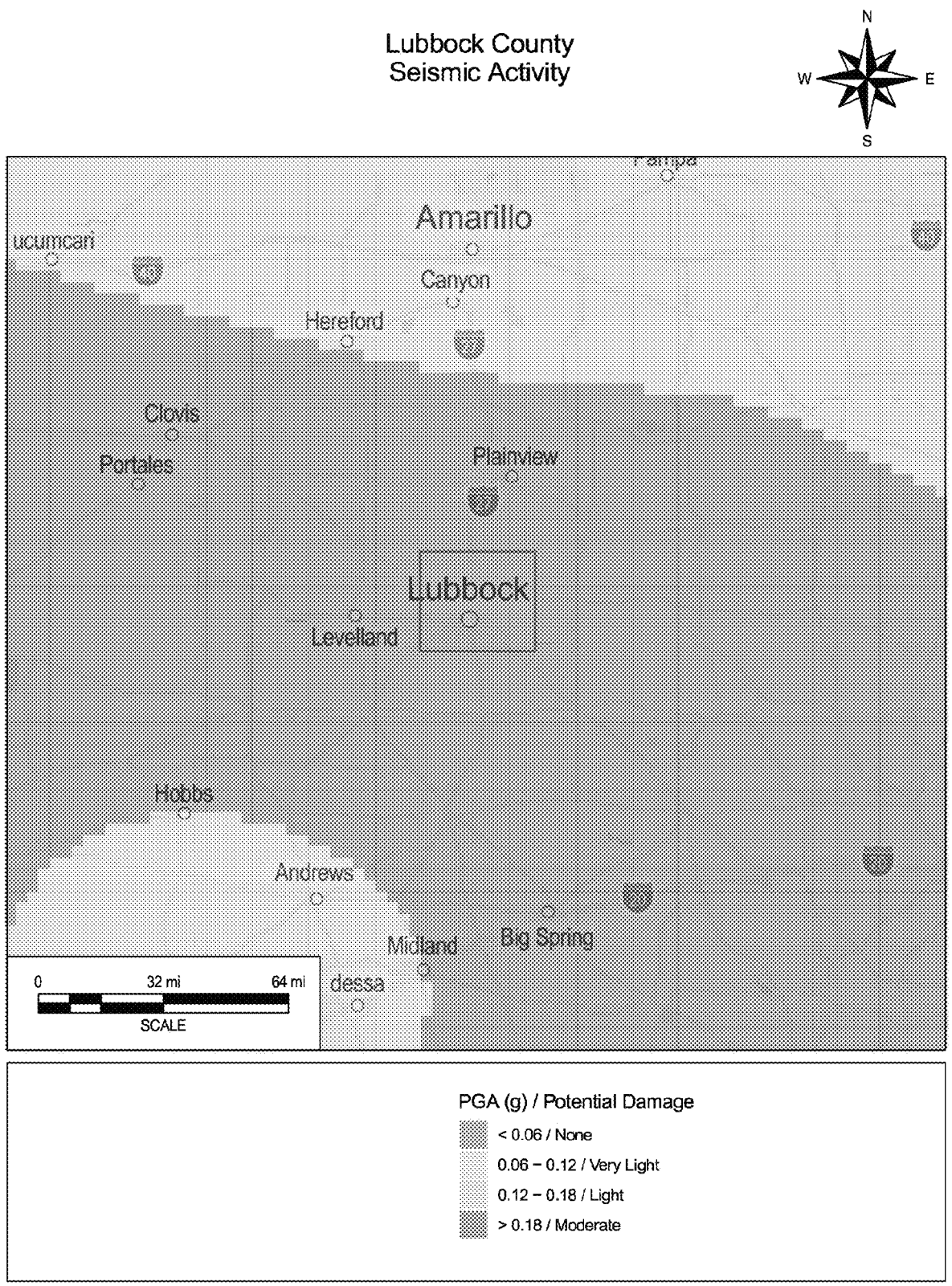
FIG. 4F is an exemplary map of seismic activity for a particular geographic area.

Lubbock County has no faults present, active or otherwise, so there is no contribution to the EFRM from this factor. FIG. 4F communicates the seismic activity zones considered in this analysis. Most of Lubbock County is less than a PGA of 0.06 so there is no potential damage expected from an earthquake in these areas. However, some zones of 0.06-0.12 are present (very light potential damage), as is a small zone of 0.12-0.18 near Amarillo (light potential damage).

Model Calculation

Figure 4G:
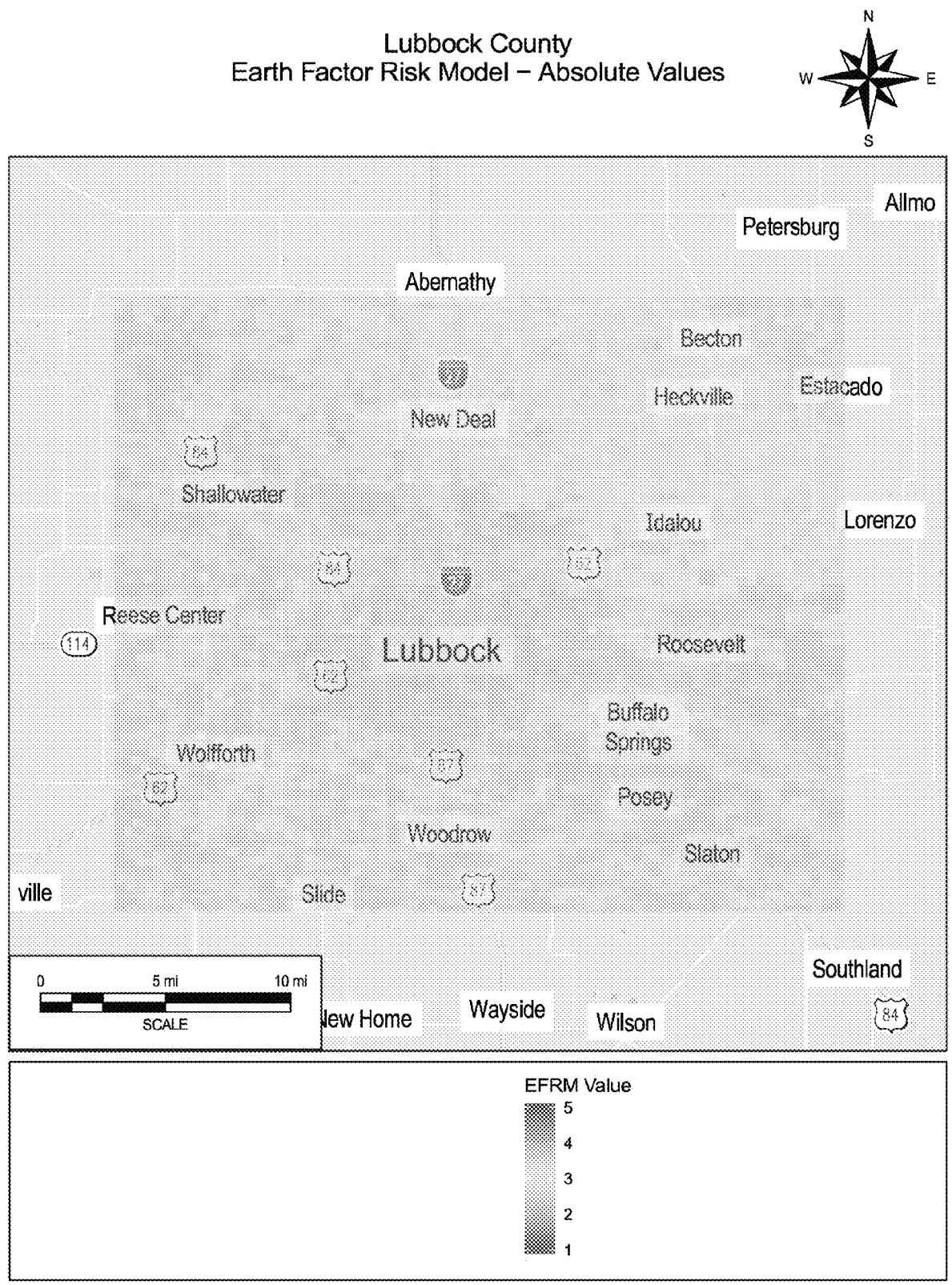
FIG. 4G is an exemplary grid of earth factor risk model as used in the system for a particular geographic area.
Figure 4H:
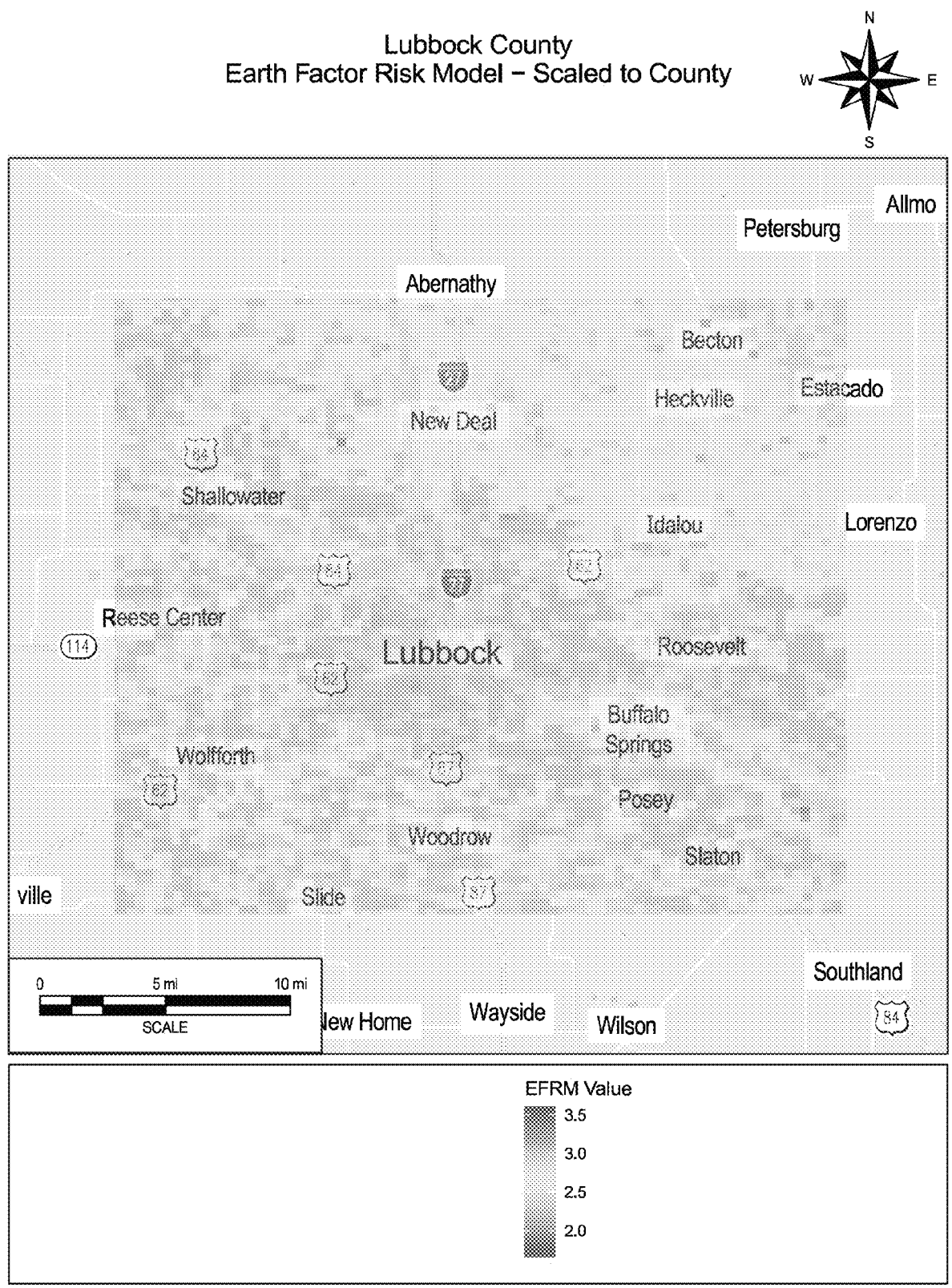
FIG. 4H depicts an exemplary grid of earth factor risk model as used in the system scaled to county for a particular geographic area.

FIGS. 4G and 4H show the final gridded EFRM output. FIG. 4G shows values colored using a scale that is directly comparable to any analyses in other counties; that is, EFRM rankings in Lubbock County all occur within the 1.0-3.56 range, whereas the model has possible values from 1.0-5.0. Therefore, FIG. 4G has been colored as if it had values ranging from 1.0-5.0. In contrast, FIG. 4H has been colored with 3.56 as a maximum value, which communicates the differences between neighboring grid cell values with a higher resolution but does not allow the figure to be compared to surrounding counties. Some "spots" of high-risk cells are present throughout the county corresponding to areas of elevated plasticity and more clayey hydrologic soil groups. The average EFRM value for the county is 2.33.

It is also appreciated by those skilled in the art that modifications can be made to the embodiments disclosed and remain within the inventive concept, such as by omitting various described features, rearranging features, and using features from one embodiment in another embodiment. Therefore, this invention is not limited to the specific embodiments disclosed, but is intended to cover changes within the scope and spirit of the claims.

The invention claimed is:

1. A system for geological infrastructure failure risk prediction comprising:
    an administrator device, connected to a geological database and a meteorological database through a network;
    a client device, connected to the administrator device, through the network;
    a set of instructions, resident on the administrator device that when executed cause the system to:
       obtain a map from the geological database;
       digitize the map to derive a set of grid cells;
       establish a set of weighting factors for a set of geological data and a set of meteorological data;
       obtain a set of geological data, from the geological database;
       obtain a set of meteorological data, from the meteorological database;
       apply a set of rating rules to the set of geological data, and the set of meteorological data, to determine a set of rating factors;
       apply the set of weighting factors to the set of rating factors to determine a set of relative ranks;
       for each grid cell of the set of grid cells:
          calculate a moisture risk factor;
          calculate an imminent seismic risk factor;
          calculate a global risk factor based on a relative rank, of the set of relative ranks, the imminent seismic risk factor and the moisture risk factor to derive a set of global risk factors; and,
          derive a comparative prediction map for the set of grid cells from the set of global risk factors.

2. The system of claim 1 wherein the set of instructions further comprises instructions that when executed cause the system to:
    send an alert, from the administrator device to the client device, when the global risk factor exceeds a threshold value.

3. The system of claim 1 wherein the set of weighting factors further comprises:
    a surficial geological weighting factor of 4;
    an expansive soils weighting factor of 6;
    a hydrological weighting factor of 2;
    a topology weighting factor of 4;
    a climatic weighting factor of 3; and,
    a seismic fault weighting factor of 1.

4. The system of claim 1 wherein the step of obtaining the set of geological data further comprises:
    obtaining a set of surficial geological data;
    obtaining a set of expansive soils data;
    obtaining a set of soil hydrological data;
    obtaining a set of topology data;
    obtaining a set of general seismic activity data; and,
    obtaining a set of seismic fault data.

5. The system of claim 4 wherein the step of obtaining the set of soil hydrological data further comprises:
    adjusting the set of soil hydrological data to account for one or more of a water body, a shoreline and a river bank.

6. The system of claim 4 wherein the step of obtaining the set of expansive soils data further comprises:
    adjusting the set of expansive soils data to account for one or more of a water body, a shoreline and a river bank.

7. The system of claim 4 wherein the step of applying the set of rating rules further comprises:
    normalizing a set of rating factors.

8. The system of claim 1 wherein the step of obtaining the set of meteorological data further comprises:
    obtaining a set of climatic data.

9. The system of claim 1 wherein each grid cell of the set of grid cells is about 4,000,000 square feet in area.

10. The system of claim 1 wherein the step of applying the set of weighting factors further comprises:
    multiplying a weighting factor of the set of weighting factors by a rating factor of the set of rating factors;
    determining a relative risk; and,
    dividing the relative risk by a minimum raw score to derive a relative rank of the set of relative ranks.

11. The system of claim 1 wherein the step of calculating the moisture risk factor further comprises:
    determining a forecast rank based on a set of forecast data;
    determining a historic rainfall rank based on a set of historic rainfall data;
    determining a current moisture rank based on a set of current moisture data; and,
    averaging the forecast rank, the historic rainfall rank and the current moisture rank.

12. The system of claim 1 wherein the step of calculating the imminent seismic risk factor further comprises:
    multiplying a seismic frequency value by an average seismic magnitude value to derive a set of seismic risk factor results; and,
    binning the set of seismic risk factor results.

13. The system of claim 1 wherein the set of rating rules further comprises:
    a surficial geology rating rule based on a number geological formulations in a grid cell of the set of grid cells.

14. The system of claim 1 wherein the set of rating rules further comprises:
    an expansive soils rating rule based on a soil plasticity index percentage;
    where:
       the soil plasticity index percentage is between about 0 and about 10%=Rating 1;
       the soil plasticity index percentage is between about 10 and about 20%=Rating 2;
       the soil plasticity index percentage is between about 20 and about 30%=Rating 3;
       the soil plasticity index percentage is between about 30 and about 40%=Rating 4;
       the soil plasticity index percentage is between about 40 and about 50%=Rating 5; and,
       the soil plasticity index percentage is between about 50 and about 60%=Rating 6.

15. The system of claim 1 wherein the set of rating rules further comprises:
    a hydrological soil group rating rule based on:
       a sand and gravel group=Rating 1;
       a silt loam and loam group=Rating 2;
       a sand clay loam=Rating 4; and,
       a clay loam through clay=Rating 7.

16. The system of claim 1 wherein the set of rating rules further comprises:

a topology rating rule based on a slope percentage;
where:
the slope percentage of about <1%=Rating 1;
the slope percentage between about 1% and about 2%=Rating 2;
the slope percentage between about 2% and about 5%=Rating 3;
the slope percentage between about 5% and about 12%=Rating 4; and,
the slope percentage of about >12%=Rating 5.

17. The system of claim 1 wherein the set of rating rules further comprises:
a climatic rating rule based on a moisture content stability;
where:
the moisture content stability of about <15=Rating 5;
the moisture content stability between about 15 and about 25=Rating 3;
the moisture content stability between about 25 and about 35=Rating 2;
the moisture content stability between about 35 and about 45=Rating 1; and,
the moisture content stability of about >45=Rating 1.

18. The system of claim 1 wherein the set of rating rules further comprises:
a seismic fault rating rule based on a number of active faults;
where:
no fault is present=Rating 0;
an inactive fault is present=Rating 2; and,
an active fault present=Rating 3.

19. The system of claim 18 wherein the set of rating rules further comprises:
a general seismic activity rating rule based on a peak ground acceleration;
where:
the peak ground acceleration is less than about 0.06=a seismic activity factor of 1;
the peak ground acceleration is between about 0.06 and about 0.12=the seismic activity factor of 2;
the peak ground acceleration is between about 0.12 and about 0.18=the seismic activity factor of 3; and,
the peak ground acceleration is greater than about 0.18=the seismic activity factor of 4.

20. The system of claim 19 wherein the set of rating rules further comprises:
summing the general seismic activity rating rule and the seismic fault rating rule.

21. The system of claim 1 wherein the set of instructions, when executed further cause the system to increment a recursive search frequency when the global risk factor exceeds a predetermined value.

22. A method of predicting geological infrastructure failure risk comprising:
obtaining a map of a geological location;
organizing the map into a set of grid cells;
establishing a set of weighting factors for a set of geological data and a set of meteorological data;
obtaining a set of surficial geological data, of the set of geological data;
obtaining a set of expansive soils data, of the set of geological data;
obtaining a set of hydrological data, of the set of geological data;
obtaining a set of topology data, of the set of geological data;
obtaining a set of climatic data, of the set of meteorological data;
obtaining a set of general seismic activity data, of the set of geological data;
obtaining a set of seismic fault data, of the set of geological data;
applying a set of rating rules to the set of geological data, and the set of meteorological data, to determine a set of rating factors;
applying the set of weighting factors to the set of rating factors to determine a relative rank for each grid cell, of the set of grid cells, to derive a set of relative ranks;
for each grid cell of the set of grid cells:
obtaining an upcoming forecast;
obtaining a historical rainfall record;
obtaining a set of satellite soil moisture data;
calculating a moisture risk factor from the upcoming forecast, the historical rainfall record and the set of satellite soil moisture data;
obtaining a set of recent seismic activity data;
deriving an imminent seismic rating factor from the set of recent seismic activity data;
for each grid cell of the set of grid cells:
calculating a global risk factor based on the relative rank, the imminent seismic rating factor and the moisture risk factor to derive a set of global risk factors; and,
deriving a comparative map for the set of grid cells from the set of global risk factors.

23. The method of claim 22 further comprising:
generating an alert, when a global risk factor of the set of global risk factors, meets a threshold value.

24. The method of claim 22 wherein the step of establishing the set of weighting factors further comprises:
establishing a surficial geological weighting factor of 4;
establishing an expansive soils weighting factor of 6;
establishing a hydrological weighting factor of 2;
establishing a topology weighting factor of 4;
establishing a climatic weighting factor of 3; and,
establishing a seismic weighting factor of 1.

25. The method of claim 22 wherein the step of obtaining the set of hydrological data further comprises:
adjusting the set of hydrological data to account for one or more of a water body, a shoreline and a river bank.

26. The method of claim 22 wherein the step of obtaining the set of expansive soils data further comprises:
adjusting the set of expansive soils data to account for one or more of a water body, a shoreline and a river bank.

27. The method of claim 22 wherein the step of applying the set of rating rules further comprises:
normalizing a set of rating factors.

28. The method of claim 22 further comprising:
providing a grid cell of the set of grid cells to be about 4,000,000 square feet in area.

29. The method of claim 22 wherein the step of applying the set of weighting factors further comprises:
multiplying a weighting factor of the set of weighting factors by a rating factor of the set of rating factors;
determining a relative risk; and,
dividing the relative risk by a minimum raw score to derive a relative rank of the set of relative ranks.

30. The method of claim 22 wherein the step of calculating the moisture risk factor further comprises:
deriving a forecast rank based on a set of forecast data;
deriving a historic rainfall rank based on a set of historic rainfall data;

deriving a current moisture rank based on a set of current moisture data; and, averaging the forecast rank, the historic rainfall rank and the current moisture rank.

31. The method of claim 22 wherein the step of deriving the imminent seismic rating factor further comprises:

multiplying a seismic frequency value by an average seismic magnitude value to derive a seismic rank;

binning the seismic rank;

where:

if the seismic rank is between 0 and 1, then the imminent seismic rating factor=0;

if the seismic rank is between 1 and 5, then the imminent seismic rating factor=1; and, if the seismic rank is between 5 and 10; then the imminent seismic rating factor=2.

32. The method of claim 22 wherein the step of applying the set of rating rules further comprises:

applying a surficial geology rating rule based on a number geological formulations in a grid cell of the set of grid cells.

33. The method of claim 22 wherein the step of applying the set of rating rules further comprises:

applying an expansive soils rating rule based on a soil plasticity index percentage;

where:

the soil plasticity index percentage is between about 0 and about 10%=Rating 1;

the soil plasticity index percentage is between about 10 and about 20%=Rating 2;

the soil plasticity index percentage is between about 20 and about 30%=Rating 3;

the soil plasticity index percentage is between about 30 and about 40%=Rating 4;

the soil plasticity index percentage is between about 40 and about 50%=Rating 5; and, the soil plasticity index percentage is between about 50 and about 60%=Rating 6.

34. The method of claim 22 wherein the step of applying the set of rating rules further comprises:

applying a hydrological soil group rating rule based on:

a sand and gravel group=Rating 1;

a silt loam and loam group=Rating 2;

a sand clay loam group=Rating 4; and, a clay loam through clay group=Rating 7.

35. The method of claim 22 wherein the step of applying the set of rating rules further comprises:

applying a topology rating rule based on a slope percentage;

where:

the slope percentage is about <1%=Rating 1;

the slope percentage is between about 1 and about 2%=Rating 2;

the slope percentage is between about 2 and about 5%=Rating 3;

the slope percentage is between about 5 and about 12%=Rating 4; and, the slope percentage is about >12%=Rating 5.

36. The method of claim 22 wherein the step of applying the set of rating rules further comprises:

applying a climatic rating rule based on a moisture content stability;

where:

the moisture content stability of <15=Rating 5;

the moisture content stability between about 15 and about 25=Rating 3;

the moisture content stability between about 25 and about 35=Rating 2;

the moisture content stability between about 35 and about 45=Rating 1; and, the moisture content stability of about >45=Rating 1.

37. The method of claim 22 wherein the step of applying the set of rating rules further comprises:

applying a seismic fault rating rule based on a number of active faults;

where:

no fault is present=Rating 0;

an inactive fault is present=Rating 2; and, an active fault present=Rating 3.

38. The method of claim 37 wherein the set of rating rules further comprises:

a general seismic activity rating rule based on a peak ground acceleration;

where:

the peak ground acceleration is less than about 0.06=a seismic activity factor of 1;

the peak ground acceleration is between about 0.06 and about 0.12=the seismic activity factor of 2;

the peak ground acceleration is between about 0.12 and about 0.18=the seismic activity factor of 3; and, the peak ground acceleration is greater than about 0.18=the seismic activity factor of 4.

39. The method of claim 38 wherein the set of rating rules further comprises:

summing the general seismic activity rating rule and the seismic fault rating rule.

\* \* \* \* \*